(12) United States Patent
Gao et al.

(10) Patent No.: US 10,454,782 B2
(45) Date of Patent: Oct. 22, 2019

(54) SYSTEM AND METHOD FOR AUTOMATING NETWORK MANAGEMENT TASKS

(71) Applicant: NETBRAIN TECHNOLOGIES, INC., Burlington, MA (US)

(72) Inventors: Lingping Gao, Burlington, MA (US); Guangdong Liao, Burlington, MA (US)

(73) Assignee: NetBrain Technologies, Inc., Burlington, MA (US)

( * ) Notice: Subject to any disclaimer, the term of this patent is extended or adjusted under 35 U.S.C. 154(b) by 863 days.

(21) Appl. No.: 14/619,957

(22) Filed: Feb. 11, 2015

(65) Prior Publication Data
US 2015/0156077 A1 Jun. 4, 2015

Related U.S. Application Data

(63) Continuation-in-part of application No. 13/841,735, filed on Mar. 15, 2013, now Pat. No. 9,374,278.

(51) Int. Cl.
H04L 12/24 (2006.01)
H04L 12/26 (2006.01)

(52) U.S. Cl.
CPC ......... H04L 41/22 (2013.01); H04L 41/0677 (2013.01); H04L 41/0686 (2013.01); H04L 41/0853 (2013.01); H04L 41/0206 (2013.01); H04L 41/0213 (2013.01); H04L 41/069 (2013.01); H04L 41/0681 (2013.01); H04L 41/12 (2013.01); H04L 43/045 (2013.01); H04L 43/0811 (2013.01); H04L 43/0817 (2013.01); H04L 43/10 (2013.01); H04L 43/16 (2013.01)

(58) Field of Classification Search
CPC ..... H04L 41/22; H04L 41/12; H04L 41/0677; H04L 41/0686; H04L 41/0206; H04L 43/0811; H04L 43/0817; H04L 43/16
USPC ........................................................ 709/223
See application file for complete search history.

(56) References Cited

U.S. PATENT DOCUMENTS 5,999,179 A * 12/1999 Kekic ................ H04L 41/0213
715/734
6,078,924 A 6/2000 Ainsbury et al.
(Continued)

FOREIGN PATENT DOCUMENTS

WO WO 2014/145818 A1 9/2014

OTHER PUBLICATIONS

PCT International Search Report and Written Opinion dated Mar. 29, 2016, issued in corresponding International Application No. PCT/US2016/015603 (11pages).
(Continued)

*Primary Examiner* — Glenton B Burgess
*Assistant Examiner* — Patrick F Ngankam
(74) *Attorney, Agent, or Firm* — Brinks Gilson & Lione

(57) ABSTRACT

A system and method for automating network management includes providing a GUI for receiving a network command to be executed on the network. The results from the execution of the network command are received by a parser including a variable for storing the retrieved information. An analysis routine is received, through the GUI, that analyzes the network based on the information in the variable. The method may include generating a network management application and may include instructions for recursively updating the variable.

20 Claims, 27 Drawing Sheets

(56) References Cited

U.S. PATENT DOCUMENTS

| | | | | |
|---|---|---|---|---|
| 6,137,782 | A | * | 10/2000 | Sharon .................... H04L 41/12 |
| | | | | 370/244 |
| 6,205,122 | B1 | | 3/2001 | Sharon et al. |
| 7,310,666 | B2 | * | 12/2007 | Benfield ............. H04L 41/0233 |
| | | | | 709/223 |
| 7,848,337 | B1 | | 12/2010 | Weng et al. |
| 8,271,626 | B2 | * | 9/2012 | Childers ............. H04L 41/0853 |
| | | | | 709/221 |
| 8,386,593 | B1 | | 2/2013 | Gao et al. |
| 2002/0054169 | A1 | * | 5/2002 | Richardson ......... H04L 41/0893 |
| | | | | 715/854 |
| 2003/0051032 | A1 | | 3/2003 | Schenkel et al. |
| 2004/0194088 | A1 | * | 9/2004 | Chen .................. G06F 9/45512 |
| | | | | 718/100 |
| 2005/0138557 | A1 | | 6/2005 | Bolder et al. |
| 2006/0031446 | A1 | | 2/2006 | Hamedi |
| 2008/0155643 | A1 | | 6/2008 | Moran et al. |
| 2010/0030984 | A1 | | 2/2010 | Erickson et al. |
| 2011/0087988 | A1 | * | 4/2011 | Ray ........................ G06Q 10/06 |
| | | | | 715/771 |
| 2011/0161730 | A1 | | 6/2011 | Van Der Merwe et al. |
| 2013/0042222 | A1 | | 2/2013 | Maddela |
| 2014/0282027 | A1 | | 9/2014 | Gao et al. |

OTHER PUBLICATIONS

PCT International Search Report dated Aug. 7, 2014, issued in related International Application No. PCT/US2014/030647 (3 pages).

* cited by examiner

FIG. 7

SYSTEM AND METHOD FOR AUTOMATING NETWORK MANAGEMENT TASKS

CROSS-REFERENCE TO RELATED APPLICATION

This application is a Continuation-In-Part (CIP) of U.S. patent application Ser. No. 13/841,735, filed Mar. 15, 2013, the content of which is incorporated herein by reference in its entirety.

TECHNICAL FIELD

This disclosure relates generally to network management. More specifically, it relates to system and method for automating network management tasks using graphical user interface and network management applications to retrieve and display dynamic network operating information.

BACKGROUND

In traditional network management and troubleshooting methods, a network professional usually runs a set of standard commands and processes manually for each network device. The commands and the parameters associated therewith, however, are difficult to remember and cumbersome to use. In addition, complicated troubleshooting methodologies are often hard to share and transfer. Therefore, even if a similar network problem occurs repeatedly, each instance of troubleshooting may still have to start from scratch. As networks are getting more and more complex, it is increasingly difficult to manage the networks efficiently with traditional methods and tools.

One traditional method for network management and troubleshooting is using the text-based Command-Line Interface (CLI). Using the CLI method, a network professional usually needs to repetitively execute the same CLI commands and decode key data from the command output many times for many network devices. This process is error-prone, strenuous, and time consuming.

It is also difficult to record a troubleshooting process for future reference using the CLI method. Without a recording mechanism, it is difficult for network professionals to share their troubleshooting knowledge and experience with other network professionals. Within the same organization the same network professional may need to spend the same amount of time and effort to troubleshoot the same problem which has occurred before.

The present disclosure is directed to overcoming or mitigating one or more of these problems as set forth above.

SUMMARY

One aspect of the present disclosure involves a method, implemented by a processor device, for providing network management automation. The method may include providing a graphical user interface (GUI) for automating network management tasks associated with a computer network. The method may also include receiving, through the GUI, a network command to be executed on the computer network. The method may further include obtaining, by the processor device, a result from the computer network based on an execution of the network command. In addition, the method may include receiving, through the GUI, a parser for retrieving information associated with a network parameter based on the result. The parser may include a variable for storing the retrieved information. The method may also include receiving, through the GUI, an analysis routine for analyzing the computer network based on the variable. Moreover, the method may include generating, by the processor device, a network management application based on the parser and the analysis routine. The network management application may include instructions for updating the variable recursively.

Another aspect of the present disclosure involves a system for providing network management automation. The system may include a memory device storing computer codes for automating network management tasks associated with a computer network. The system may also include a processor device operatively coupled to the memory device. The computer codes stored on the memory device, when executed by the processor device, cause the processor device to perform various operations. The operations may include providing a graphical user interface (GUI) and receiving, through the GUI, a network command to be executed on the computer network. The operations may also include obtaining a result from the computer network based on an execution of the network command. The operations may further include receiving, through the GUI, a parser for retrieving information associated with a network parameter based on the result. The parser may include a variable for storing the retrieved information. In addition, the operations may include receiving, through the GUI, an analysis routine for analyzing the computer network based on the variable. Moreover, the operations may include generating a network management application based on the parser and the analysis routine. The network management application may include instructions for updating the variable recursively.

A further aspect of the present disclosure involves a method, implemented by a processor device, for providing network management automation. The method may include providing a graphical user interface (GUI). The method may also include executing, by the processor device, a network management application to automate network management tasks associated with a computer network. Execution of the network management application may include recursively executing a network command to obtain result information from the computer network and retrieving, using a parser of the network management application, information associated with a network parameter based on the result information. Execution of the network management application may also include storing the retrieved information in a variable of the parser and analyzing, using an analysis routine of the network management application, the computer network based on the variable. In addition, the method may include displaying an analysis result in the GUI.

A further aspect of the present disclosure involves a system for providing network management automation. The system may include a memory device storing computer codes for automating network management tasks associated with a computer network. The system may also include a processor device operatively coupled to the memory device. The computer codes stored on the memory device, when executed by the processor device, cause the processor device to perform various operations. The operations may include providing a graphical user interface (GUI) and recursively executing a network command to obtain result information from the computer network. The operations may also include retrieving information associated with a network parameter based on the result information. The operations may further include storing the retrieved information in a variable of the parser and analyzing the computer network based on the variable. In addition, the operations may include displaying an analysis result in the GUI.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 7 shows an exemplary GUI for displaying execution results of a Procedure, according to some embodiments of the present disclosure.

DETAILED DESCRIPTION

Figure 1:
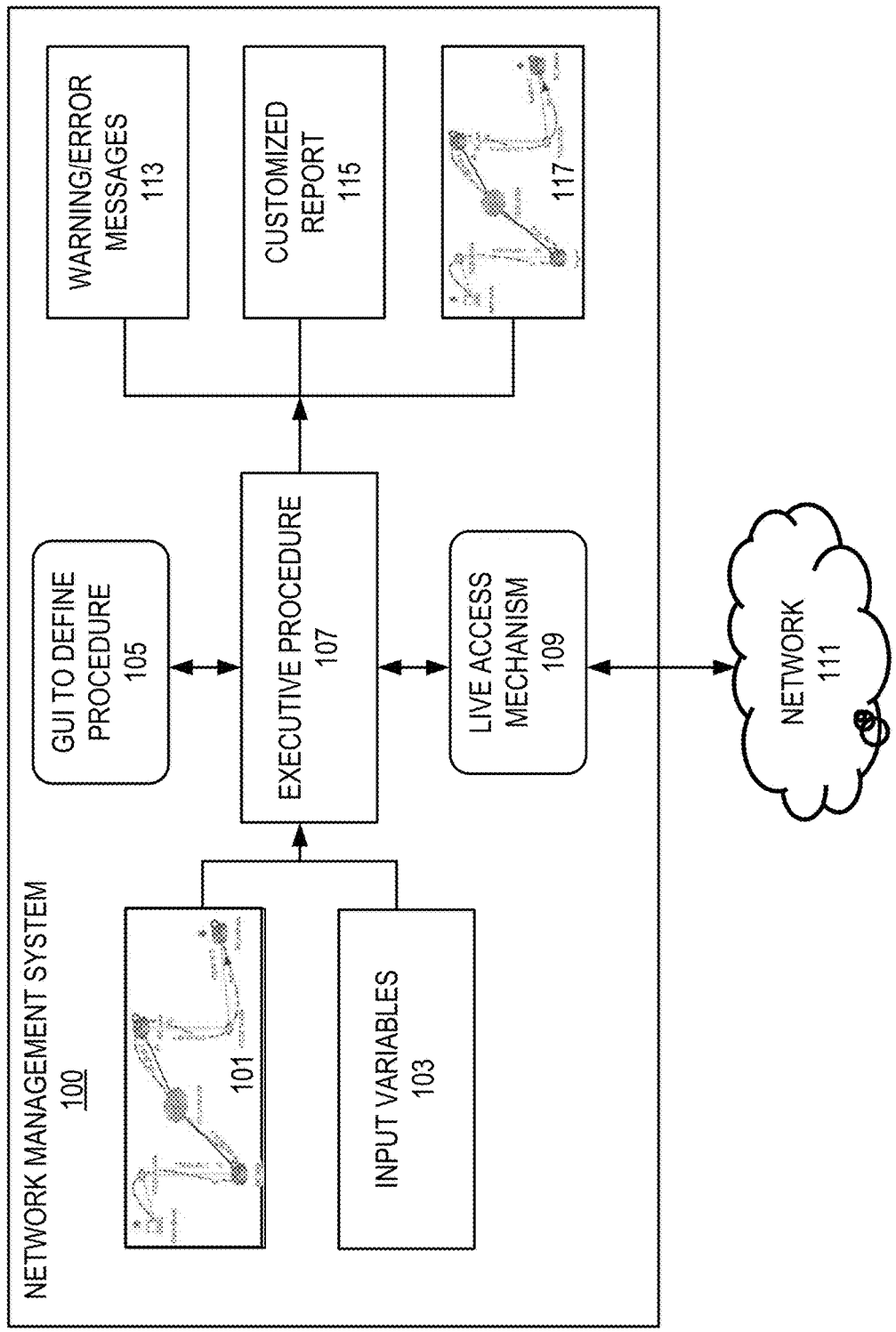
FIG. 1 shows an exemplary functional interaction flow of an Executable Procedure of a GUI based network management system, according to some embodiments of the present disclosure.

Reference will now be made in detail to exemplary embodiments of the invention, examples of which are illustrated in the accompanying drawings. When appropriate, the same reference numbers are used throughout the drawings to refer to the same or like parts.

A particularly powerful tool for understanding network behavior is graphic visualization. A computer-aided network engineering system, NETBRAIN™ Workstation, enables automation in network troubleshooting. A user such as a network professional can follow a few steps to troubleshoot a network problem including mapping the problem area, probing from a network map, and comparing the current network state with baseline data. Using a network management application known as an Executable Procedure (or Executive Procedure or simply Procedure), the user can select and execute one or more suitable Procedures relevant to the network problem from the network map. The output of the Procedure(s) may help to identify the cause of the problem.

In network troubleshooting, a network engineer may use a set of commonly used commands, methods, and tools, either standard or proprietary. For example, these commands, methods, and tools include the following items:

The Command Line Interface (CLI): network devices often provide CLI commands to check the network status or statistics. For example, in a Cisco IOS switch, the command "show interface" can be used to show the interface status such as input errors.

Ping: a simple tool used to check whether a device is reachable from another device. For example, after a network reconfiguration, it is normally a best practice to ping the main servers from the core network devices to ensure no major outage of key applications.

Traceroute: a tool to check the route from a device to a destination device. This tool is useful to troubleshoot a connectivity problem.

Configuration management: a tool used to find differences of configurations of network devices in a certain period. This is important since about half of the network problems are caused by configuration changes.

Troubleshooting procedures, usually provided by hardware vendors or experts in the field, may comprise the following sequence of actions:

Execute the CLI, ping, traceroute, or other commands from one or more network devices;
Find one or more key values from the command output;
Compare the key value(s) with one or more standard values;
Conduct actions depending on the key value(s) and/or the comparison. For example, the actions may include executing other commands to further troubleshoot the network problem, determining the cause, and isolating the issue.

In traditional methods, each of these steps is generally performed manually on one network device at a time, which are tedious and error prone.

Some embodiments of the present disclosure utilize GUIs to provide a visual presentation of network commands, network executable processes, and/or network strategic procedures. These commands and processes can be visually represented, defined, and made accessible through GUIs and visual symbols.

Some embodiments may include a GUI to define an Executable Procedure. This user interface provides an easy way to define Procedures to allow a user to create a Procedure without special training in network programming. After a Procedure is saved, a standalone application containing executable codes may be created. In one example, creating the standalone application from the Procedure may be implemented using Python Script. Other suitable types of programming languages can also be used to convert a Procedure defined through the GUI to an executable standalone application.

In some embodiments, the GUI may include a Probe, a Trigger, and/or a Process Node.

A Probe includes a set of functions that retrieve and parse data from a network device.

A Trigger includes a set of functions that define the logic to analyze data.

A Process Node is a visual representation of a block of executable codes that generally include zero to multiple Probes and/or Triggers.

Some embodiments may include four types of Probes: a CLI command Probe runs CLI commands, and parses and analyzes the result; a Configuration Probe analyzes the configurations; a Ping Probe checks the connectivity between devices; a Traceroute Probe runs the traceroute command between two devices.

Some embodiments may include an Executable Procedure (or referred to as a Procedure for simplicity). A Procedure includes a set of processes and strategies to achieve a result that can be presented visually through the GUI. A Procedure may contain multiple Process Nodes and logic workflows from one Process Node to another.

Some embodiments may include a Parser. A Parser includes a set of functions that define how to retrieve data from the output of an execution of a CLI, ping, traceroute or any other types of commands. Depending on the format of the output, four types of Parsers may be provided: Keyword, Paragraph, Table, and Filter Parsers.

The configured and saved Executable Procedures may automate conventional troubleshooting processes. For example, an Executable Procedure can perform the following tasks automatically:

Issue a command (CLI command/ping/traceroute/SNMP) to one or more network devices and collect the output via a Probe;
Parse the command output to retrieve key data via a Parser;
Analyze the key data using a Trigger;
Output possible errors or warnings and advices via a GUI; and/or
Create a network map and/or a document for an underlying network system or the troubleshooting process.

FIG. 1 shows a GUI-based Procedure system 100 for network management. System 100 includes a GUI 105. GUI 105 may be used to define an Executable Procedure 107. Executable Procedure 107 may be defined by a set of visual block-based programming interfaces to allow a user to effectively program or create network management applications. After a Procedure is saved, system 100 can create a standalone application containing executable codes, for example, using Python Script or any other type of programming language to convert Procedure 107 defined through GUI 105 to executable codes.

Executable Procedure 107 can be executed within a network map 101. For example, in a common scenario, a user creates network map 101 to include network devices and/or network interfaces relevant to a network task, and then selects the relevant Procedures to run within network map 101. Executable Procedure 107 can also receive user input, such as input variables 103 through a user input interface. When Procedure 107 is executed, Procedure 107 can collect data from various types of network devices in a live network 111 via a live access mechanism 109. The output of Executable Procedure 107 may include warning or error messages 113, customized report 115, and a network map 117 with the problem area being highlighted or noted.

Figure 2:
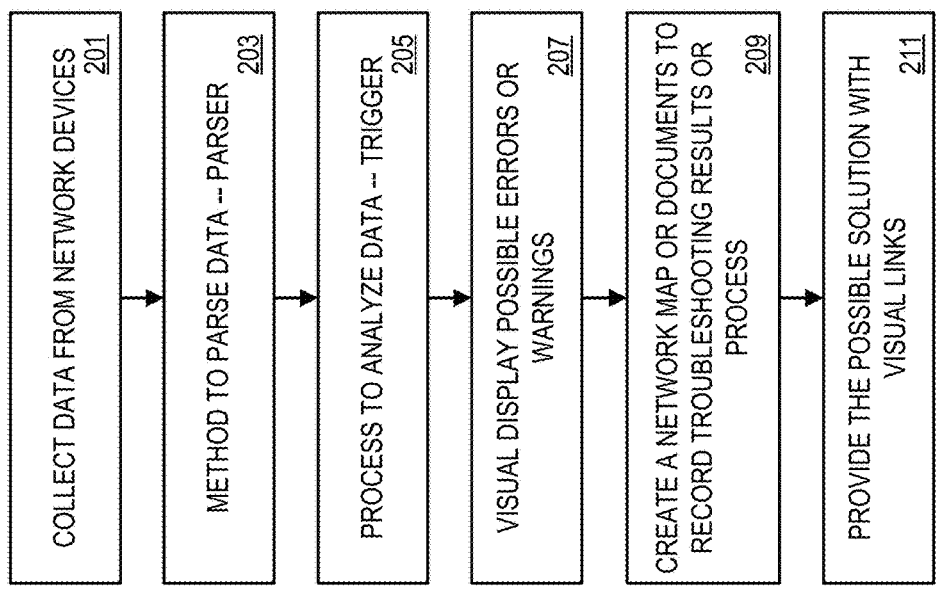
FIG. 2 is a flow chart of an exemplary execution flow of an Executable Procedure of a GUI based network management system, according to some embodiments of the present disclosure.

FIG. 2 shows a flow chart of an exemplary troubleshooting process using an Executable Procedure. At step 201, a group of built-in functions may be called and executed on a network or a network device to collect data. The data can be parsed at step 203 to extract key information. A Trigger may be used to analyze the extracted key information at step 205. The analysis result such as error messages or warnings can be displayed at step 207. A network map or document may be created to record the troubleshooting result or process at step 209. Possible solutions may be provided with visual links at step 211. The knowledge or logic to troubleshoot a network problem may be included and saved in the Procedure. Therefore, a network professional does not need to memorize manuals or steps for troubleshooting a common network problem.

Figure 3:
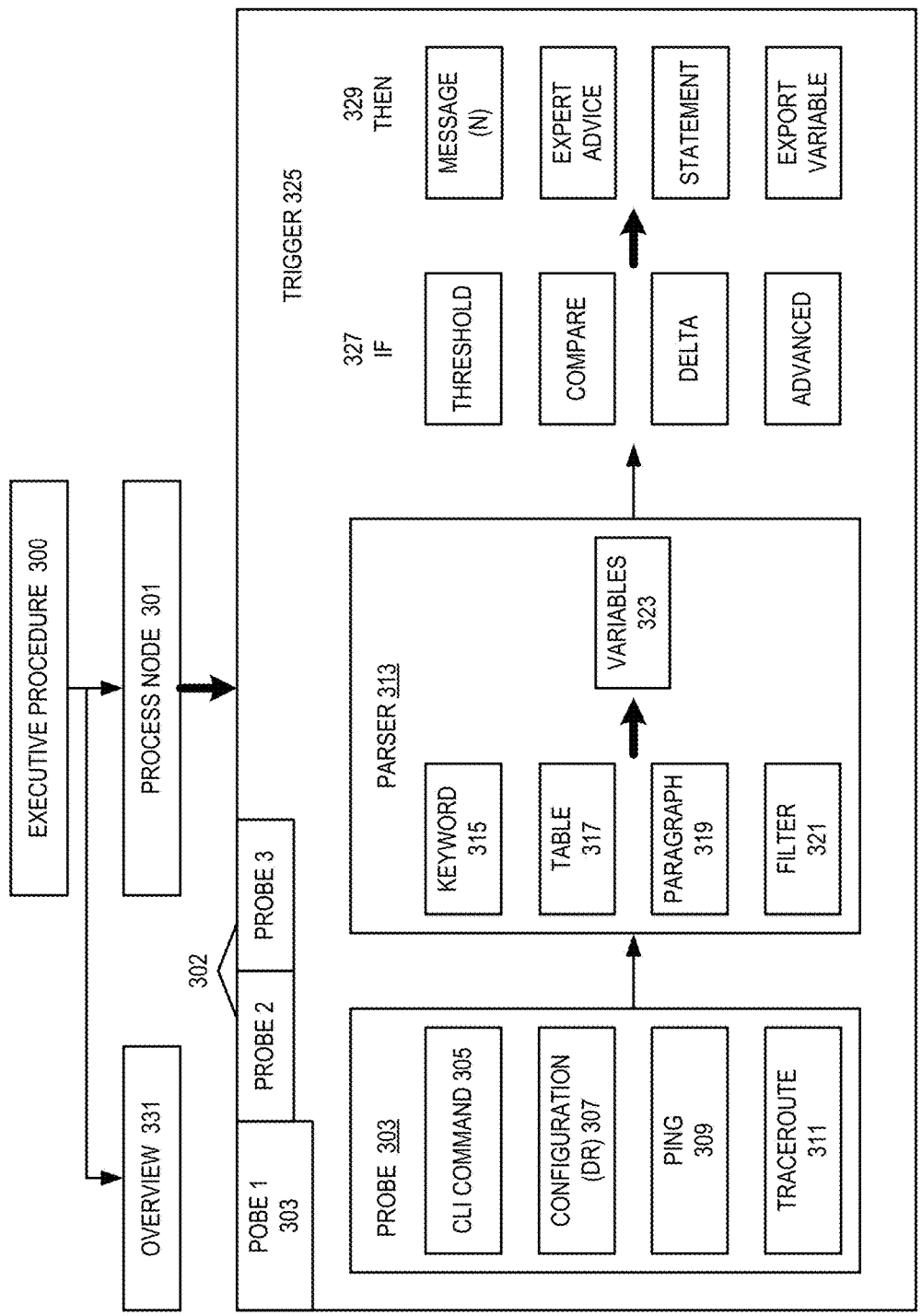
FIG. 3 illustrates an exemplary process for constructing an Executable Procedure, according to some embodiments of the present disclosure.

FIG. 3 shows an exemplary Executable Procedure 300 including a Process Node 301, which further includes one or more Probes (Probe1 303, Probe2 302, etc.). Probe1 303 may include one or more commands, standard functions, and/or proprietary functions, such as CLI Command 305, Configuration (DR) 307, Ping 309, and/or Traceroute 311. Process Node 301 may also include one or more Parsers 313, which may include Keyword Parser 315, Table Parser 317, Paragraph Parser 319 and/or Filter Parser 321. Process Node 301 may also include one or more Triggers 325 that define various sets of "If" and "Then" analysis logic loops 327 and 329. Trigger 325 may include a plurality of settings. For example, Trigger 325 may include settings of Threshold, Compare, Delta, and/or Advanced. Variable output 323 from Parser 313 may be analyzed automatically with preset conditions of normality or abnormalities.

Executable Procedure 300 may include an Overview Node 331 that includes the description of Procedure 300 such as what the Procedure does, the author, a sample map, etc.

In some embodiments, a Process Node may be a programming unit of an Executable Procedure. The Process Node may be configured to finish a task. Each Node may be executed on a device at a time. In some embodiments, a built-in logic loop may allow the same logic to be executed across a dynamic set of devices. A Process Node may contain zero to multiple Probes and Triggers. A Probe may retrieve and parse data from a device. A Trigger may define logic to analyze the data. In some embodiments, four built-in Probes corresponding to common tools for network management may be provided.

CLI command Probe may be configured to run CLI command and to parse and analyze the result. Configuration Probe may be configured to analyze configurations. Ping Probe may be configured to check the connectivity between devices. Traceroute Probe may be configured to run a traceroute between two devices.

Besides the Probes described above, system 100 may also include other Probes such as SNMP Probes. A SNMP Probe may be configured to retrieve data via SNMP and to analyze the data.

A Parser may define how to parse the data from an output. Depending on the format of the output, the data may be parsed using a Keyword Parser, a Paragraph Parser, a Table Parser, or a Filter Parser.

Keyword Parser may be configured to retrieve an instance of the data. For example, Keyword Parser may retrieve the IOS version from the output of a "show version" command.

A Paragraph Parser may be configured to parse data if the original data (e.g., configurations or CLI command output) include multiple repeating instances. For example, Paragraph Parser may retrieve the CDP neighbor entries from the output of a "show cdp neighbors" command.

A Table Parser may be configured to parse data if the CLI command output is formatted as a table. For example, Table Parser may retrieve EIGRP neighbor details from a "show ip eigrp neighbor" command.

A Filter Parser may be configured to filter a partial data from the original data.

Data retrieved by a Parser may be stored in one or more output variables.

A Trigger may define the control flow to analyze the output variables retrieved by a Parser. For example, a Threshold Trigger can run a Parser once and compare a variable with a threshold value. For example, a Threshold Trigger can compare the CPU usage of a network device with a threshold value, such as 90%. If the CPU usage is higher than this threshold value, a warning message may be created.

A Compare Trigger can run a Parser against two data sources (e.g., live data and baseline data) and check whether a variable changes. For example, Compare Trigger can compare configurations retrieved from a live network with benchmark configurations and output any difference.

A Delta Trigger can run a Parser twice within a certain time interval and check whether a variable changes. For example, a Delta Trigger can retrieve CRC errors of a network interface within a certain time interval such as 5 seconds. If the CRC errors increase, an error message may be created indicating that the cable connected to this network interface does not work properly.

If one or more Triggers described above do not find the problem, an Advanced Trigger with advanced options may be used.

An exemplary logic used in a Trigger is as follows:

```
if (condition1)
    action block 1
else if (condition 2)
    action block 2
else
```

System 100 may conduct an action block under a corresponding condition. Each action block can include multiple messages, an expert advice block, a statement block, an export variable block, and/or a control action probe.

A message can be shown in the Message field of a Procedure Task (e.g., a GUI to show results after a Procedure is executed). There may be three types of messages: the error message indicating an error requiring an immediate action, the warning message indicating something abnormal occurred, which requires attention, and the information message.

The Expert Advice field may be in text format for the Procedure user to give advice if a specified condition occurs. It can be displayed in the Procedure Task window when a user views the detail of a message.

The Statement field can be any executable code such as making function calls to draw a map or creating customized fields for device properties.

Figure 4:
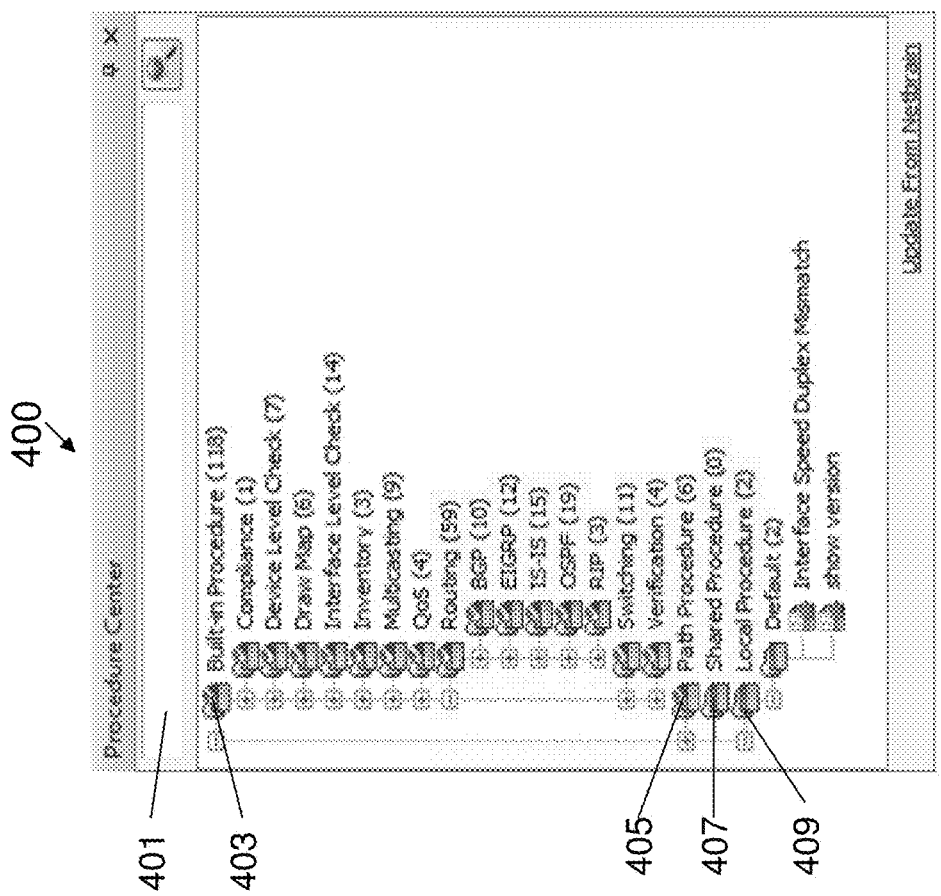
FIG. 4 shows an exemplary GUI for managing various Executable Procedures, according to some embodiments of the present disclosure.

Executable Procedures can be organized by category. In one exemplary implementation, in reference to FIG. 4, a Procedure Center 400 is provided to manage the Procedures. Built-in Procedures for common use cases are provided under the built-in category 403, but a user-created Procedure can also be placed and managed here and shared through a common server. By sharing Executable Procedures inside an enterprise or across network professionals around the world, some common types of network problems can be quickly solved by running shared Executable Procedures. There may be provided other categories of Procedures, such as Path Procedure 405, Shared Procedure 407, and Local Procedure 409.

At the top of the Procedure Center, there may be provided a search box 401, where a keyword (for example, "eigrp") can be entered and the Procedures matching the keyword can be found.

For built-in Procedures, they may be categorized by the following usage cases: Compliance, Device Level Check, Draw Map, Interface Level Check, Inventory, Multicasting, QoS, Routing, Switching, and Verification. A category can also have subcategories. For example, the Routing category may have five subcategories: BGP, EIGRP, ISIS, OSPF, and RIP.

A Path Procedure may be a special type of Procedure used to discover the path between two end points. There may be provided with built-in Path Procedures and customized Path Procedures.

A Shared Procedure may be saved in a common database of the network management system and can be accessed by a client.

A Local Procedure may only be saved on a local disk and not shared with others.

Procedures may often be executed from within a network topology map. An exemplary common use case is as follows: a user creates a map for the network devices relevant to a network (e.g., the problem area of a troubleshooting task). The user may then execute one or more Procedures from within the map to gather data, analyze data, and identify possible causes.

Figure 5:
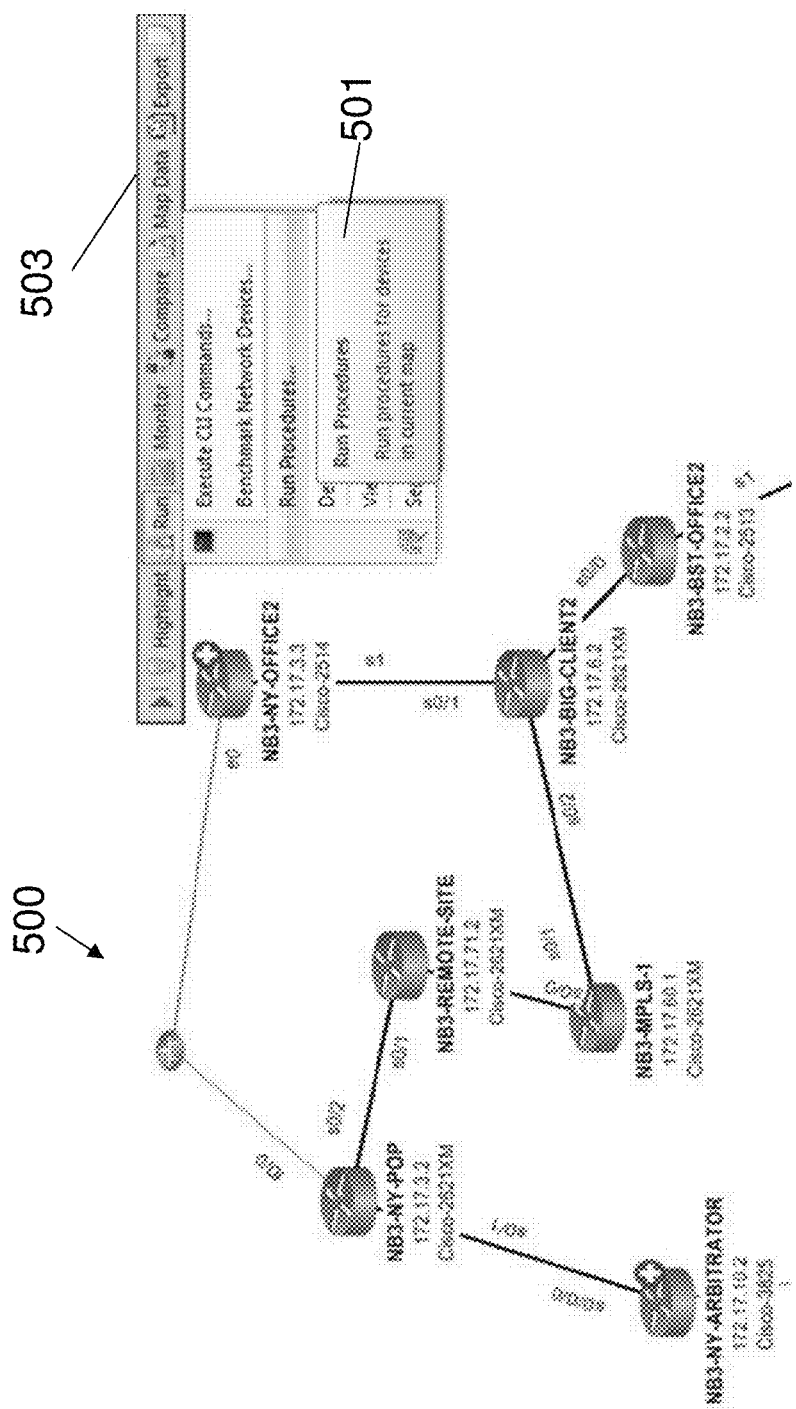
FIG. 5 shows an exemplary method to run an Executable Procedure within a network device map, according to some embodiments of the present disclosure.
Figure 6:
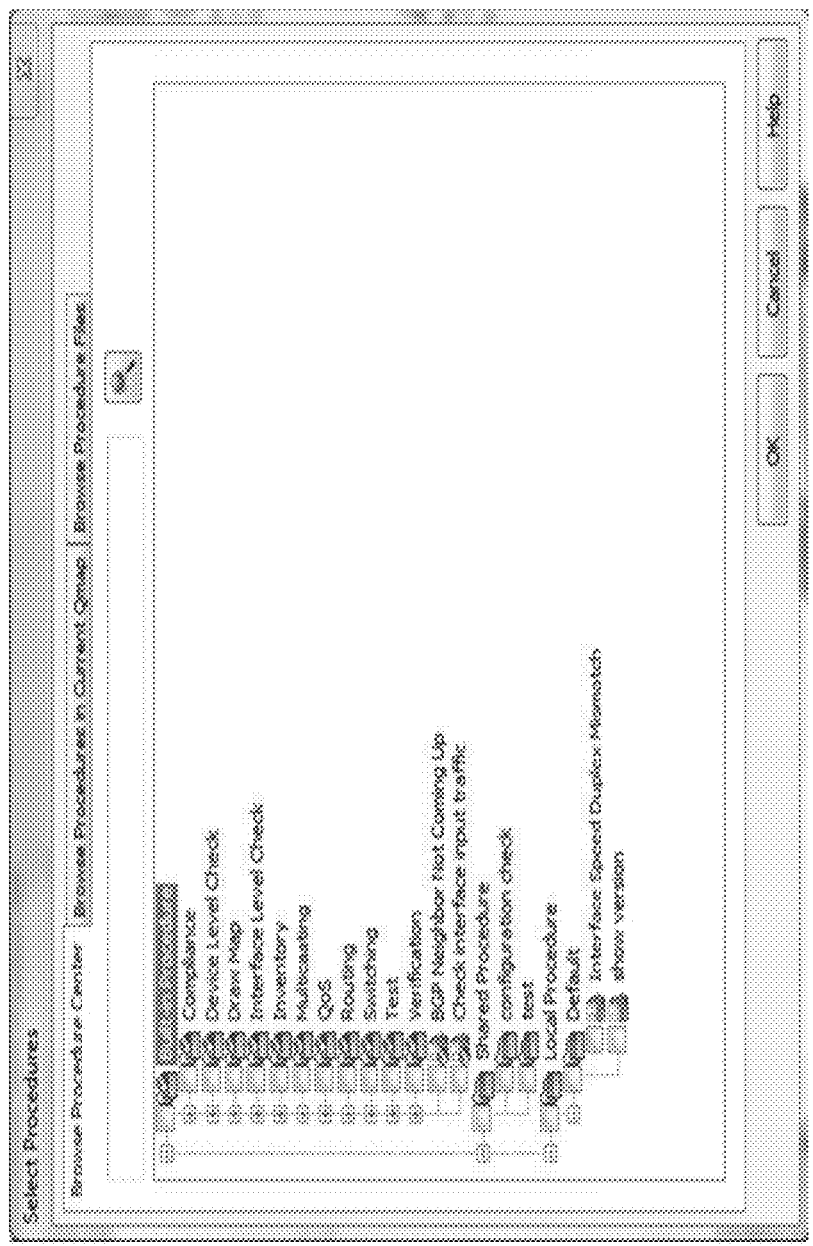
FIG. 6 shows an exemplary GUI for selecting Procedures, according to some embodiments of the present disclosure.

FIG. 5 shows an exemplary method to run a Procedure within a map 500. A run procedure menu 501 may be added in a float menu 503 of the map. After a user clicks Run Procedure in menu 501, a window shown in FIG. 6 may be displayed for the user to select Procedures from the Procedure Center. The user can click the + sign in front of any category and select one or more Procedures in the Procedure Center to run the selected Procedure(s).

Figure 7:
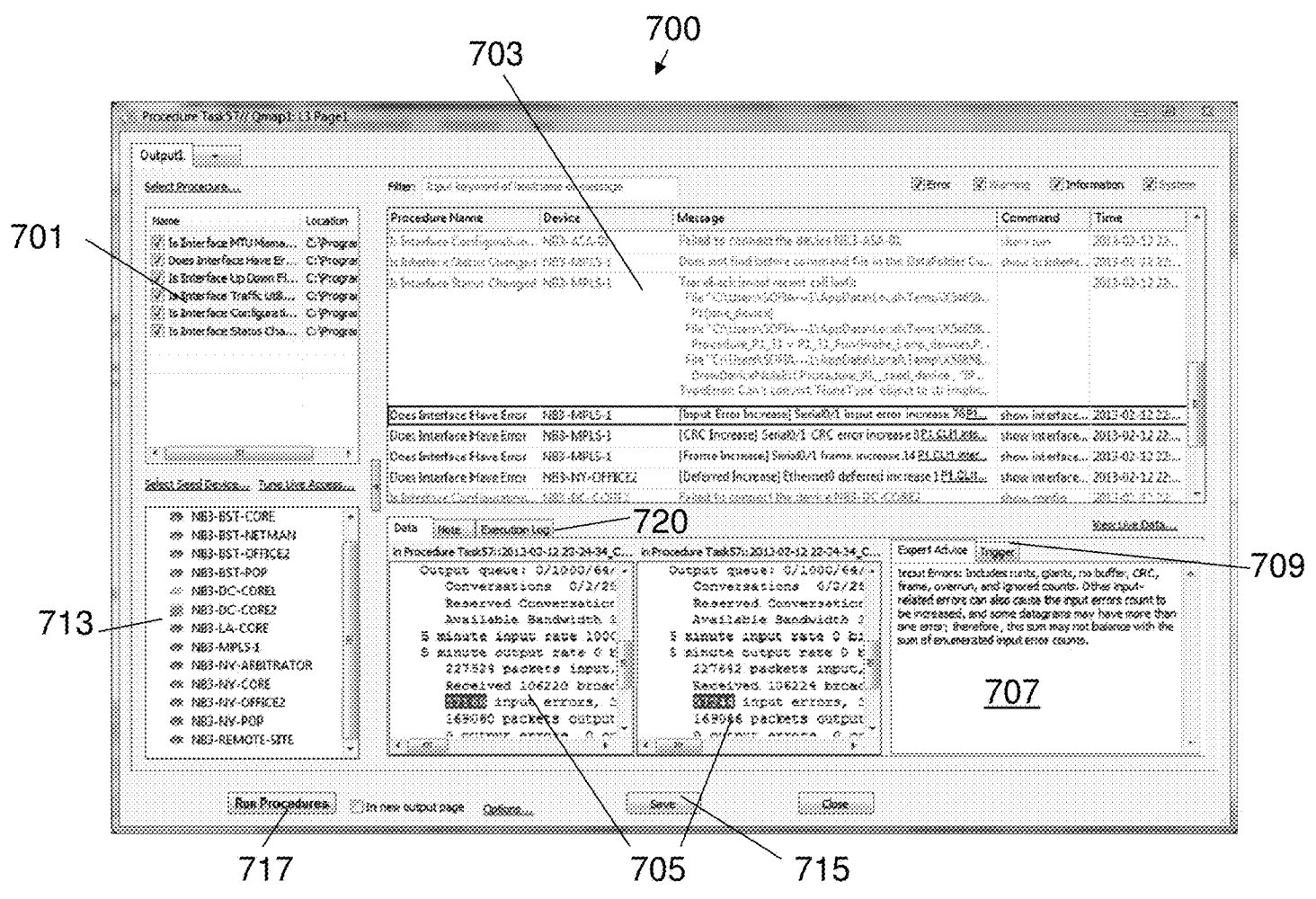

FIG. 7 shows a Procedure Task window 700 to display Procedure results. The Procedures are listed in Pane 701 and messages relevant to the Procedures are displayed in Pane 703. If a Procedure is selected in Pane 701, then only the messages relevant to the selected Procedure are displayed in Pane 703. A user can also select the type of messages to be displayed. For example, the user may check the Error checkbox and uncheck other checkboxes to only display error messages. Details of a selected message are displayed in Pane 705. The command output related to this message is also shown in Pane 705. Expert advice is shown in Pane 707 and a trigger to print out this message is shown in Pane 709. The execution log for the whole Procedure Task can also be displayed in Pane 705 when the tab Execution Log 720 is selected. The execution log displays the details of how the Procedures are executed.

The network devices on which the Procedures are executed are listed in Pane 713. A user can use the Select Seed Devices link to add more devices. Or, the user can remove one or more devices by right clicking on a device and selecting "Remove" from the menu.

A Procedure Task can be saved as a file by clicking a Save button 715. The saved Procedure Task can be opened for future examination or be sent to a peer for review. A Run Procedure button 717 allows a user to rerun the Procedure Task.

Figure 8:
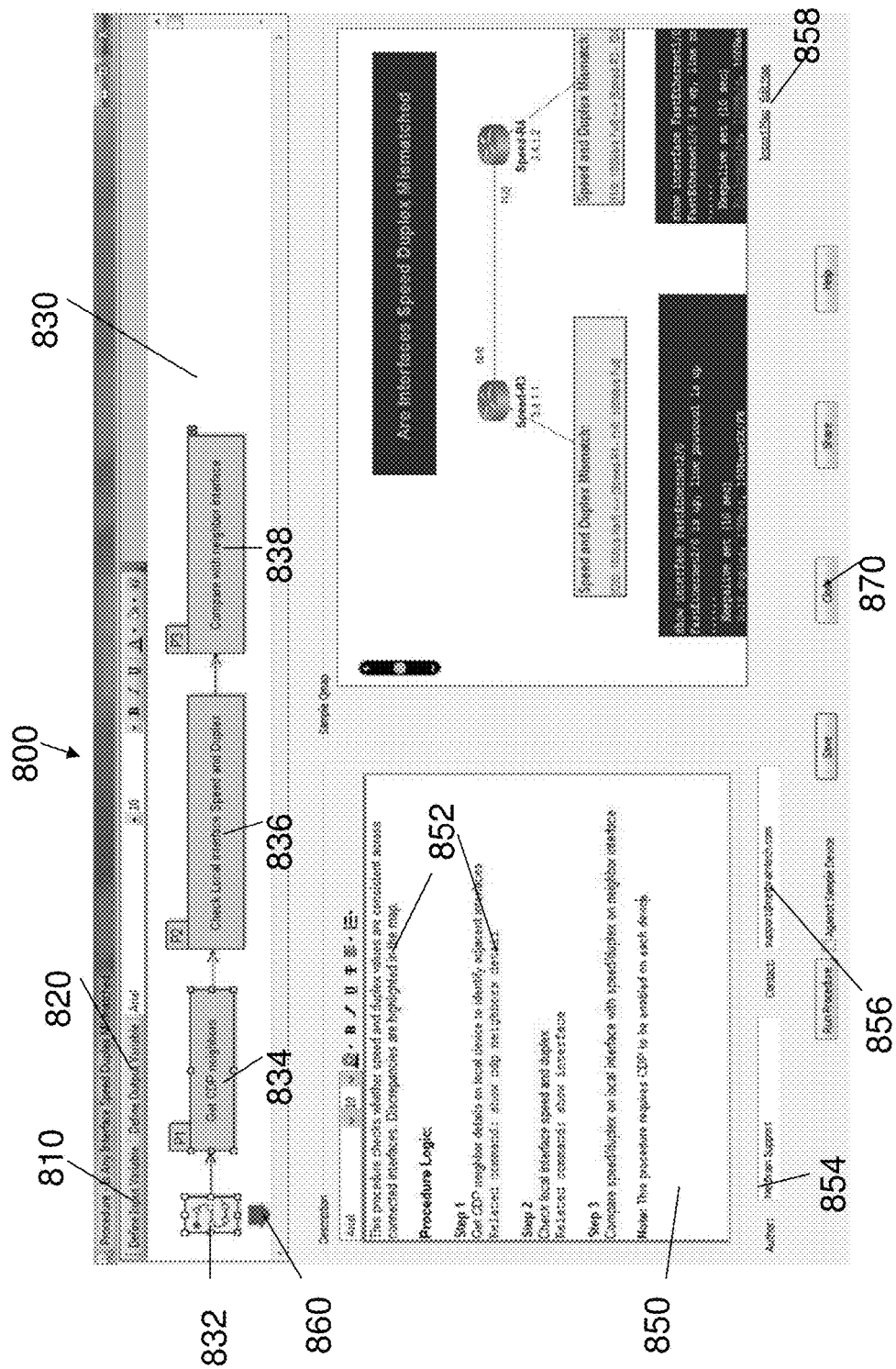
FIG. 8 shows an exemplary Procedure having three Process Nodes, according to some embodiments of the present disclosure.

FIG. 8 shows a window 800 displaying an exemplary Executable Procedure. This example Procedure is used to check whether the speed or duplex of the neighbor interfaces are mismatched. Buttons 810 and 820 are used to define the global input and output variables of the Procedure, which will be described in greater detail later. The flow chart shown in the upper pane 830 describes the overall flow of the Procedure. The Procedure has a summary Node 832 and one or more Process Nodes. In this example, there are three Process Nodes 834, 836, and 838. The lower pane 850 shows the details of the current Node 832 (the Node with the arrow 860 under it). Clicking on another node may set that node as the current node.

In summary Node 832, a user can enter a description 852 to describe what the Procedure is for, author information 854, and contact information 856. An Import Sample Qmap link 858 can be used to import a map to illustrate the problems this Procedure is configured to solve.

In this example, description 852 provides the summary of the Procedure and steps to solve the problems:

This procedure checks whether speed and duplex values are consistent across connected interfaces. Discrepancies are highlighted in the map.
Step 1
Get CDP neighbor details on local device to identify adjacent interfaces
Related command: show cdp neighbors detail
Step 2
Check local interface speed and duplex
Related command: show interface
Step 3
Compare speed/duplex on local interface with speed/duplex on neighbor interface
Note: This procedure requires CDP to be enabled on each device.

Without automation, it may take a few days to perform these steps. With the Executable Procedure Interface, three process nodes 834, 836 and 838 are created to execute corresponding steps 1, 2, and 3 in minutes.

After the Procedure is defined, the user may click a save button 870 to save the Procedure. The Procedure may be saved as a file with the specific file name extension, for example, .qapp (meaning "quick application").

Figure 9:
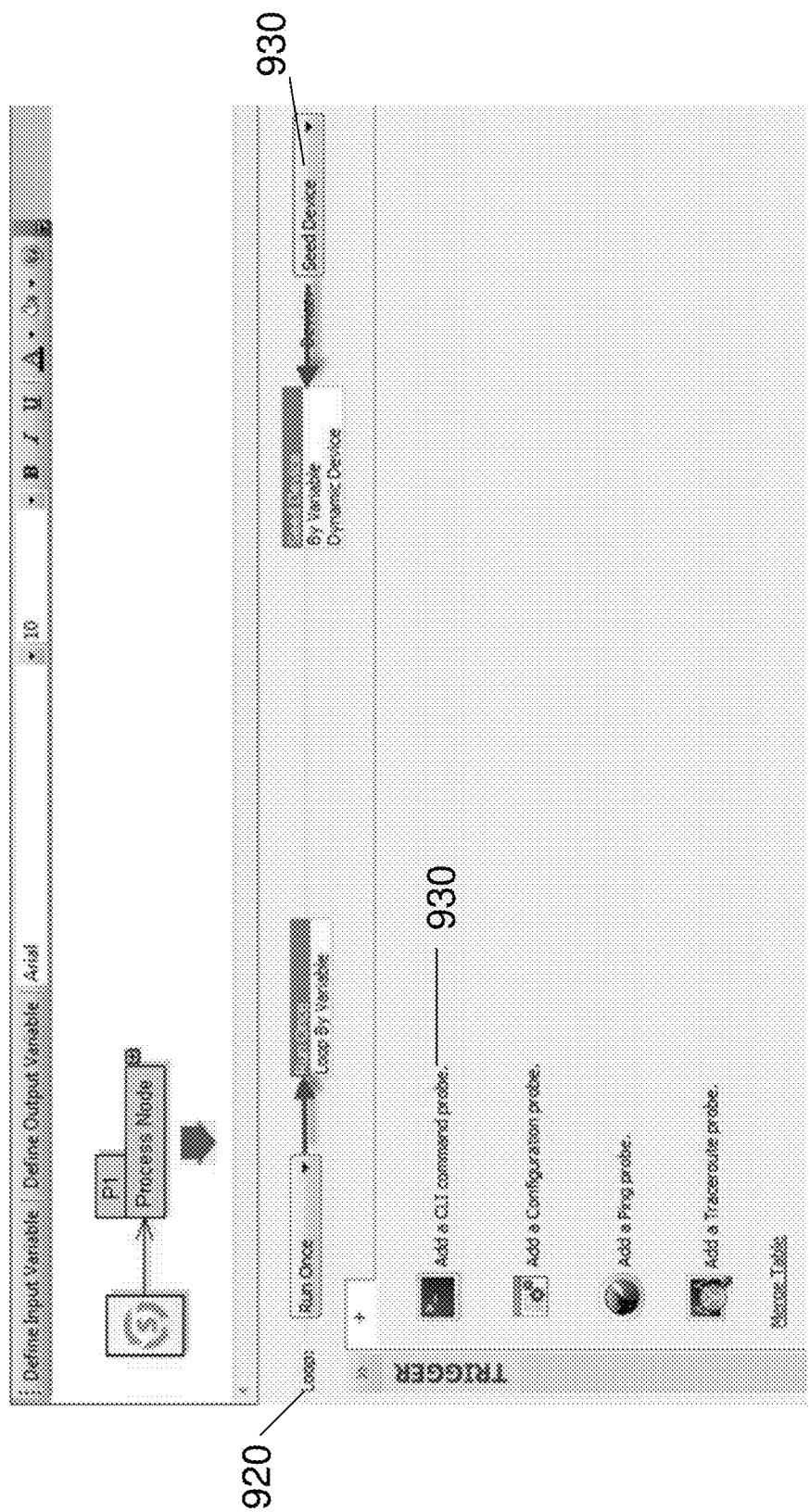
FIG. 9 shows an exemplary GUI for defining a Process Node, according to some embodiments of the present disclosure.

FIG. 9 shows an exemplary method to define a Process Node. In some embodiments, two options may control how a Process Node is executed: Loop 920 and Devices 930. The Loop option defines the loop for the block of codes corresponding to the Process Node. The Devices option defines on which network device(s) the Node should be executed.

There may be two options for Loop 920: Run Once, indicating that the Node will only run once for each seed device, and Loop by Variable, indicating that the Node will run for each element of the variable.

There may be three options for Devices Option 930: Seed Device, By Variable, and Dynamic Device. Default option Seed Device indicates that the Node will run on one or more seed devices. The seed device(s) may be selected by the user while running the Procedure. Option By Variable indicates that the node will run on the devices defined by the variable. Option Dynamic Device is used to run the Procedure recursively until a certain condition is satisfied. The Dynamic Device option can be used to map out the topology from a seed device.

The user can select one of the four types of Probes. For example, by clicking "add a CLI command Probe" 930 to define the CLI command probe, a window 1000 is shown (FIG. 10).

Figure 10:
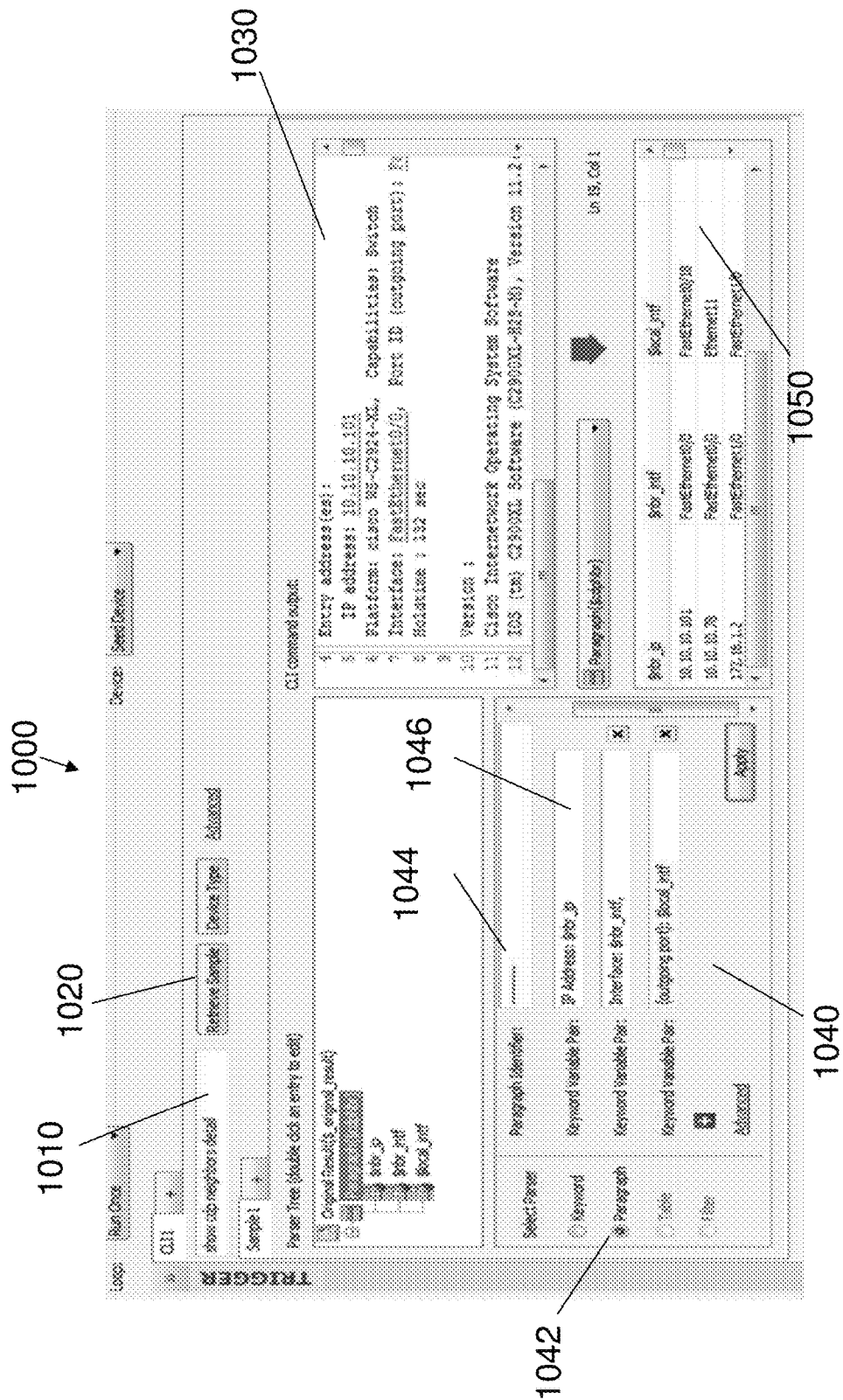
FIG. 10 shows an exemplary GUI for defining a CLI command Probe, according to some embodiments of the present disclosure.

Referring to FIG. 10, a user may first enter the CLI command in field 1010. In this example, the CLI command, "show cdp neighbors detail," is used to retrieve the neighbor device and connected interfaces. The user may then retrieve a sample output to define a Parser. The user can click the Retrieve Sample button 1020 and select a device. The sample output may be shown in field 1030. The following is an exemplary sample output:

```
lablosSwitch3>show cdp neighbors detail
------------------------
Device ID: 2900XL-1
Entry address(es):
   IP address: 192.168.1.210
Platform: cisco WS-C2924C-XL, Capabilities: Trans-Bridge Switch
Interface: FastEthernet0/3, Port ID (outgoing port): FastEthernet0/5
Holdtime : 150 sec
Version :
Cisco Internetwork Operating System Software
IOS (tm) C2900xl Software (C2900xl-C3H2S-M), Version 12.0(5)WC5, RELEASE SOFTWARE (fc1)
Copyright (c) 1986-2002 by cisco Systems, Inc.
Compiled Tue 28-May-02 11:11 by devgoyal
advertisement version: 2
Protocol Hello: OUI=0x00000C, Protocol ID=0x0112; payload len=27, value=
00000000FFFFFFFF010121FF00000000000005080703CC0FF0001
VTP Management Domain: ''
Native VLAN: 1
Duplex: full
Management address(es):
------------------------
```

-continued

```
Device ID: NY_POP
Entry address(es):
    IP address: 172.22.20.2
Platform: cisco 2500, Capabilities: Router
Interface: FastEthernet0/7, Port ID (outgoing port): Ethernet0
Holdtime : 160 sec
Version :
Cisco Internetwork Operating System Software
IOS (tm) 3000 Software (IGS-IN-L), Version 11.1(10), RELEASE
SOFTWARE
(fc1)
Copyright (c) 1986-1997 by cisco Systems, Inc.
Compiled Mon 10-Mar-97 15:53 by dschwart
advertisement version: 1
Management address(es):
```

Using the provided sample output, the user can define a set of Parsers in window 1040 for the Procedure to retrieve data from a running output. Depending on the format of the output, the user can select four types of Parsers: Keyword, Paragraph, Table, and Filter Parsers, as described above.

The sample output may include multiple neighbors. The output of each neighbor may have identical formatting. For this type of output, the Paragraph Parser 1042 may be selected to parse the data. The Paragraph Identifier 1044 is the keyword to identify the start of a new paragraph, in this sample the keyword is "--------------". For each paragraph the user can define the keyword/variable pair 1046 (Keyword Parser). The keyword is the string that stays the same and the variable is a value that can change. In this example, three keyword variable pairs may be defined:

IP Address: $nbr_ip
Interface: $nbr_intf,
(outgoing port): $local_intf

The matched values may be highlighted in the sample output and may also be shown in pane 1050.

Figure 11:
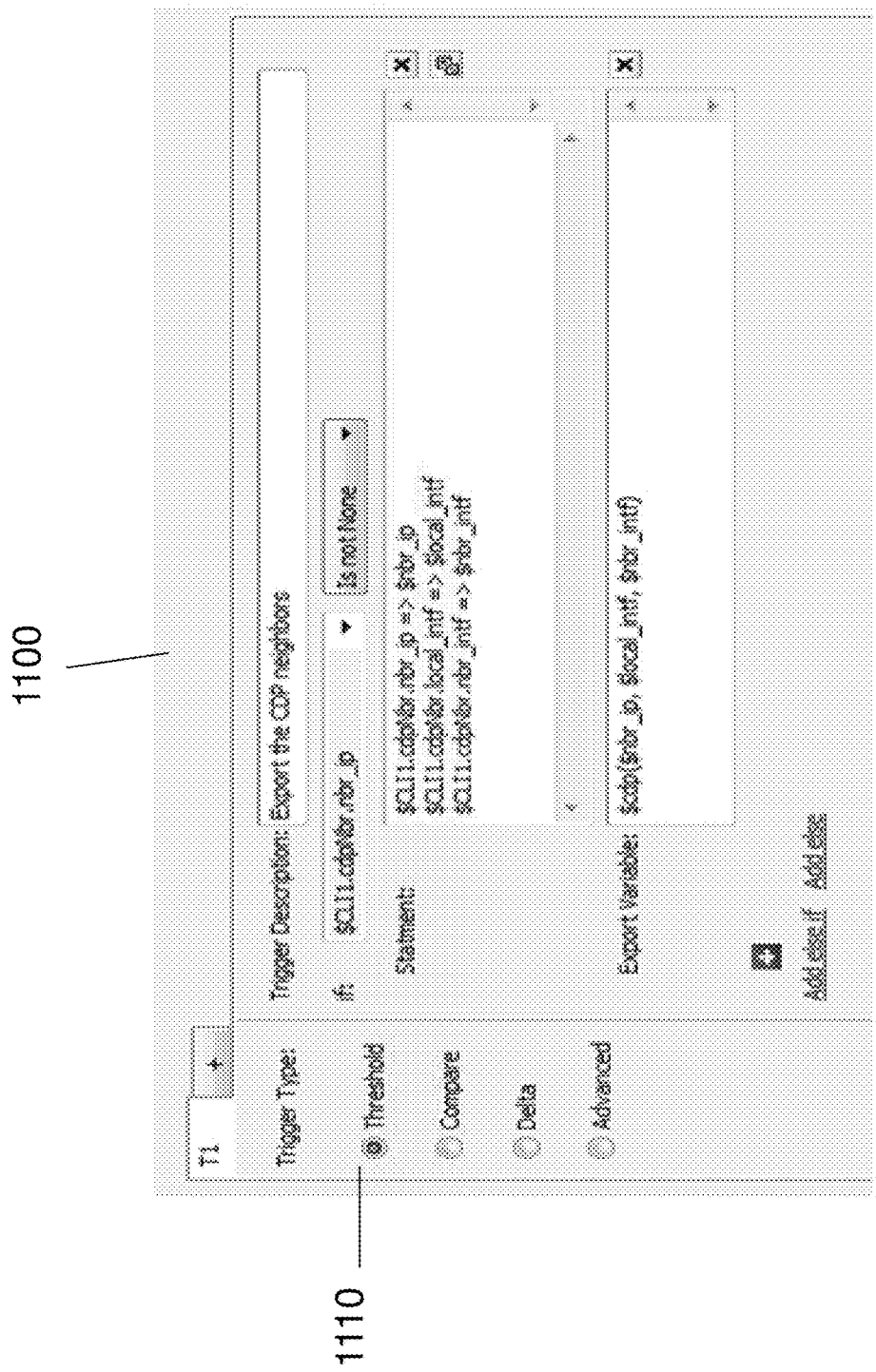
FIG. 11 shows an exemplary GUI for defining a Trigger, according to some embodiments of the present disclosure.

FIG. 11 shows a window 1100 to define an exemplary Trigger. The exemplary Trigger 1110 is a Threshold Trigger that checks whether one of the variables defined in a Parser is "Not None." If so, the Threshold Trigger executes the statements shown in the Statement pane to assign variables and then exports these variables so that downstream process nodes can use the variables.

Figure 12:
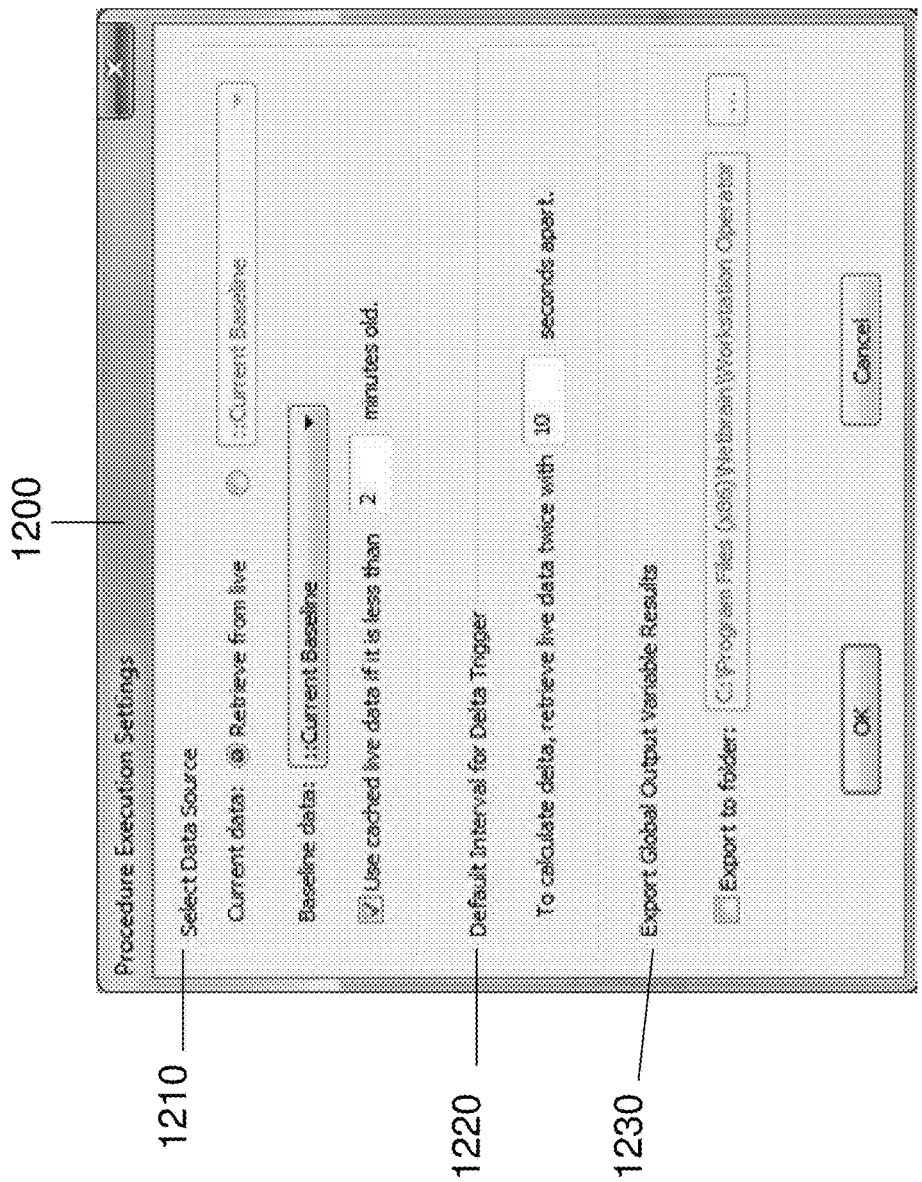
FIG. 12 shows an exemplary GUI for defining parameters to execute a Procedure, according to some embodiments of the present disclosure.

FIG. 12 shows an exemplary GUI 1200 with settings to run a Procedure. Three types of settings are shown. The first type of setting is Data Source 1210. By default, a standard Procedure can retrieve data from a live network. However, a user can set the option to use cached data stored in a data folder. In a Trigger, the current data is compared with baseline data. By default, the current baseline serves as the baseline data. The user can also select another data folder for the baseline data. The second type of setting is Default Interval for Delta Trigger 1220. For a Delta Trigger, data will be retrieved twice, with the time interval value defined here. The third type of setting is Export Global Output Variable Results 1230. Checking the checkbox of this option allows exporting global output variables to a selected file directory.

A Procedure can have input variables and output variables, similar to an application. The input variables allow a Procedure to be executed in different environments without any modification.

Figure 13:
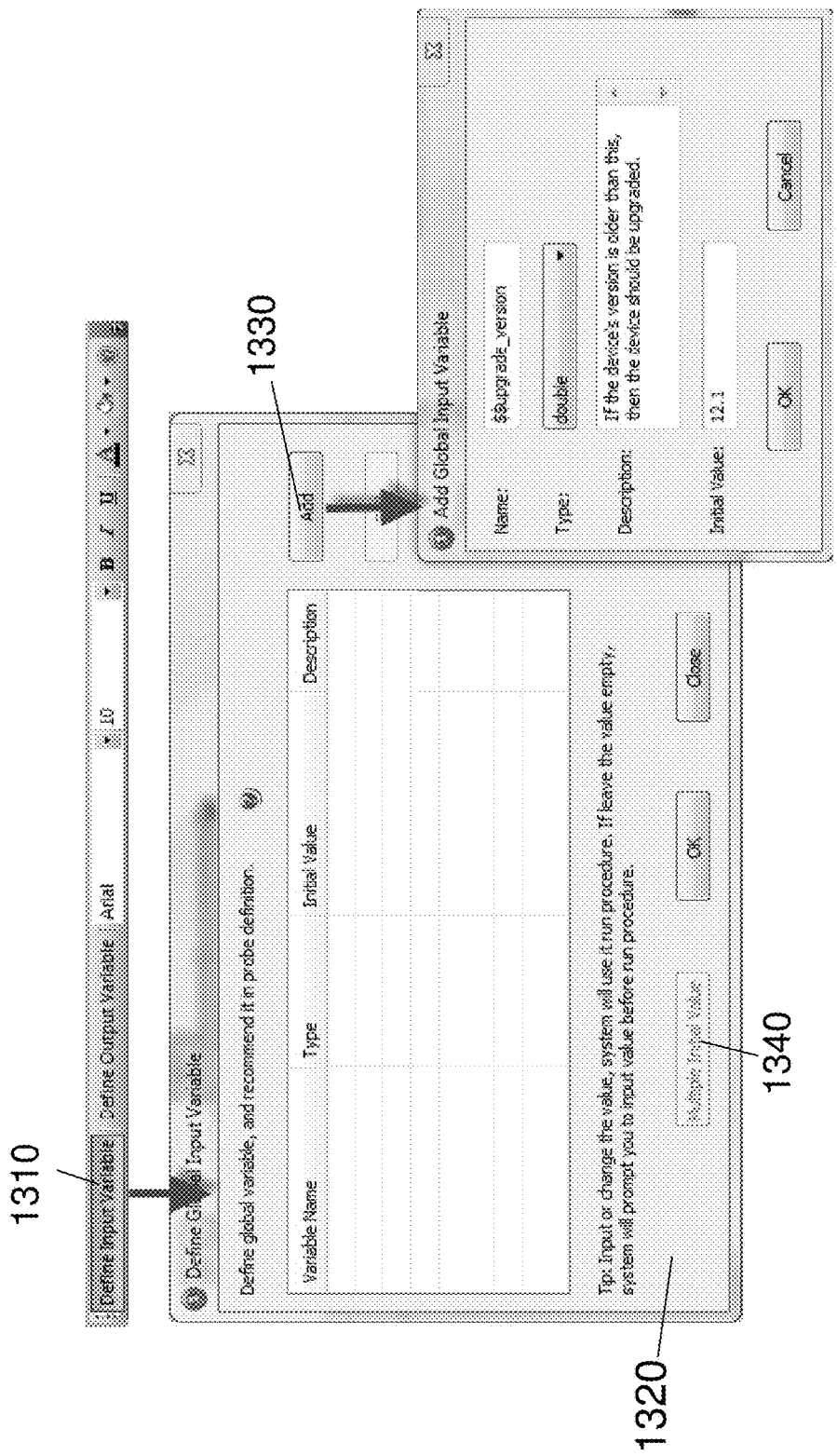
FIG. 13 shows an exemplary GUI for defining input variables to execute a Procedure, according to some embodiments of the present disclosure.

FIG. 13 shows an exemplary method to define input variables for an Executable Procedure. To define a global input variable, a user may click the Define Input Variable button 1310 at the top of the Procedure window. In the Define Global Input Variable window 1320, the user may click the Add button 1330 to add the input variables. In the Add Global Input Variable window, the user may enter the variable name and select the type. In this example, the global variables start with $$ to differentiate from local variables of a process node. Other symbols may also be used. The Description is optional, but a meaningful description can make the Procedure easy to read and use. The Initial Value is also optional and can be set to the most frequently used values if possible. The user can click the Multiple Value link 1340 to set more than one value and system 100 may run the Procedure with each value. This can be convenient in some cases, for example, if the user creates a Procedure to map a multicasting source tree. The user can run this Procedure with the input variable set to multiple sources.

Figure 14:
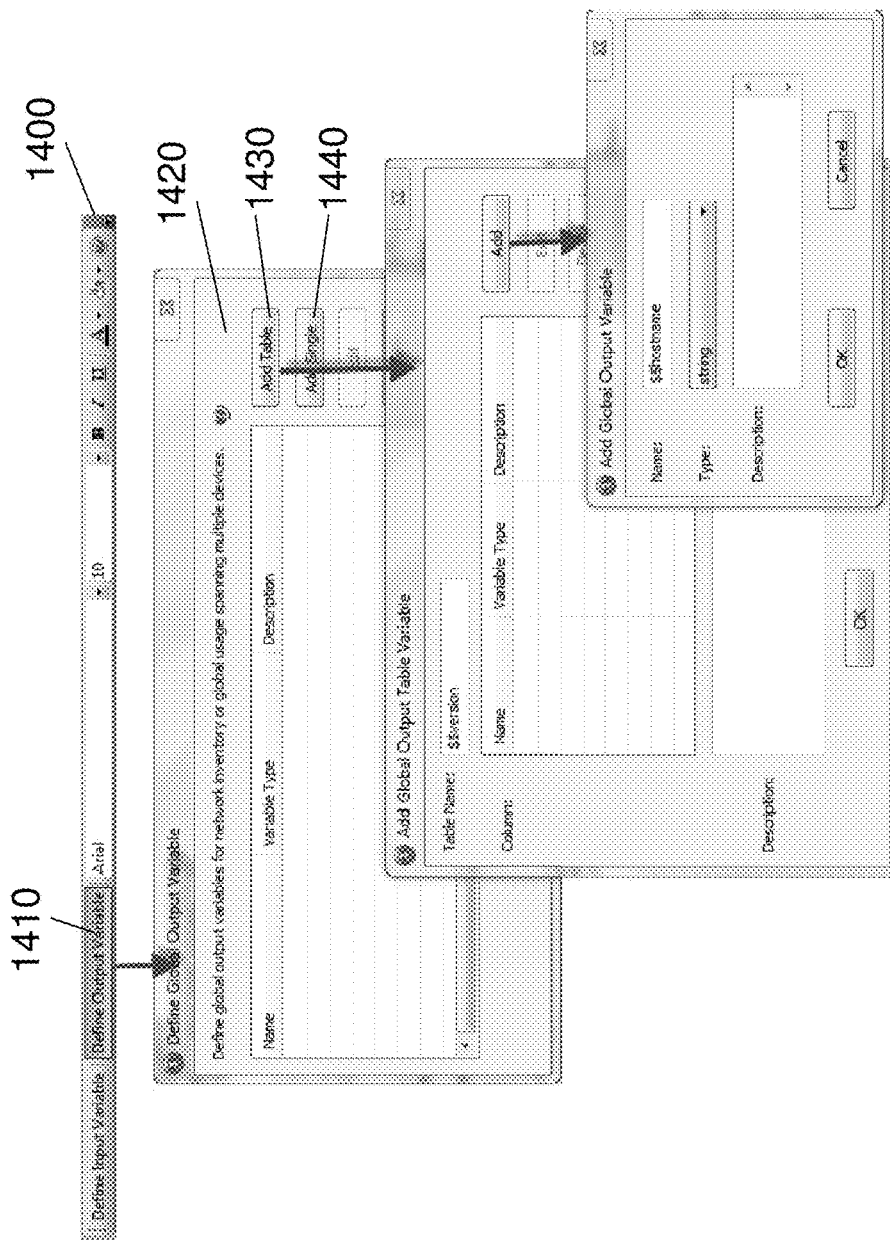
FIG. 14 shows an exemplary GUI for defining output variables to execute a Procedure, according to some embodiments of the present disclosure.

FIG. 14 shows an exemplary method to define output variables. One purpose of using the global output variables is to create a report. For example, a user may want to create a report to include all devices and neighbor interfaces having duplex or speed mismatched.

To define output variables, the user may click the Define Output Variables button 1410 at the top of the Procedure window 1400. In the Define Global Output Variable window 1420, the user may click the Add Table button 1430 to add a variable table or the Add Single button 1440 to add a basic variable. Similar to the global input variable, the global output variable may start with $$. A table can have many columns and each column can have different types of variables.

Besides the CLI command probe, system 100 may also support Ping, Traceroute, and/or Configuration Probes.

Figure 15:
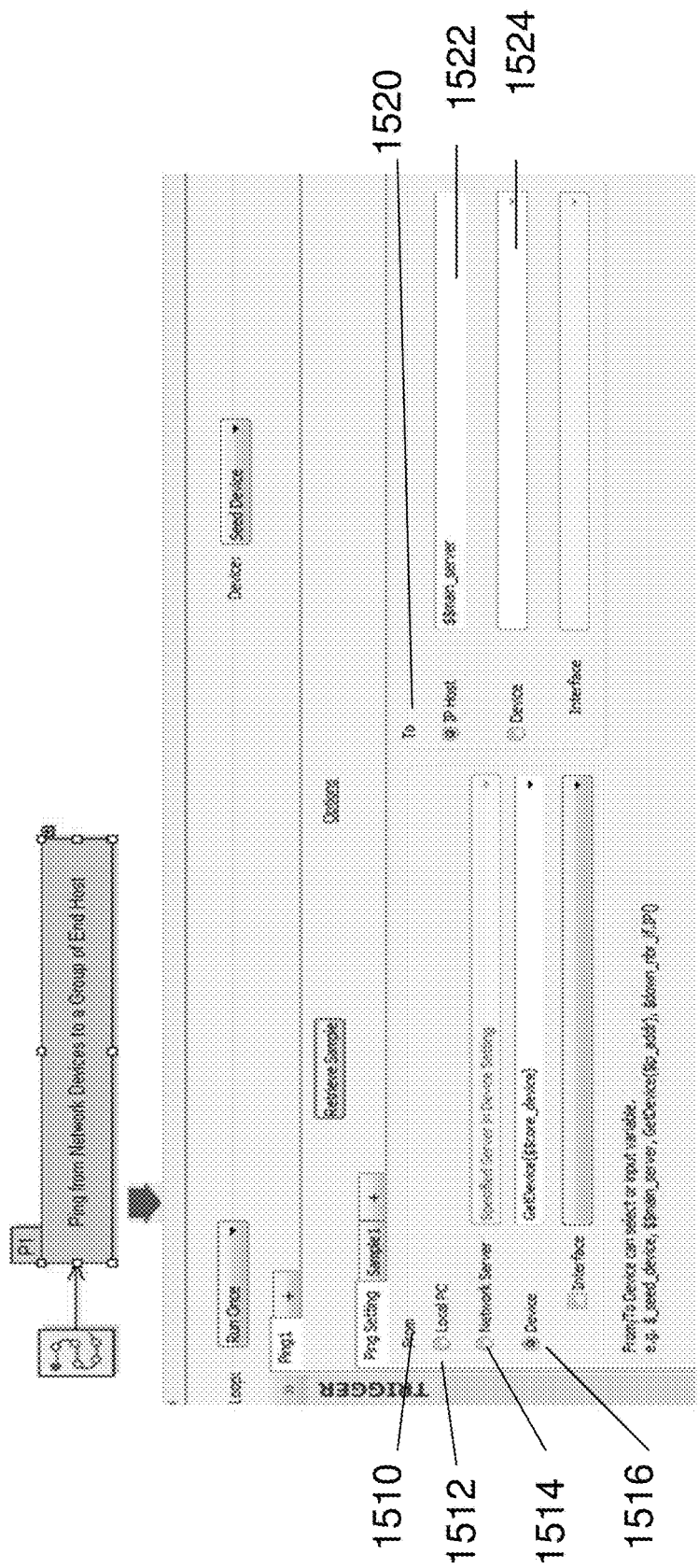
FIG. 15 shows an exemplary GUI for defining a Ping Probe, according to some embodiments of the present disclosure.

FIG. 15 shows an exemplary method to define a Ping Probe. To define a Ping Probe, a user needs to define a source 1510 (the device to ping from) and a destination 1520 (the IP to ping to). For source 1510, the user may have three options: local PC 1512; network server 1514, which is a specified server used to work as a proxy to the live network; or selected devices 1516, where the user can define a list of core devices as the input variables and let system 100 to ping from these devices.

For destination 1520, the user can either enter the IP address 1522 to ping from or select a device 1524 and then an interface on the device. In the example shown here, the IP Host option is checked and the input variable is entered, which defines the IP address to ping to.

Figure 16:
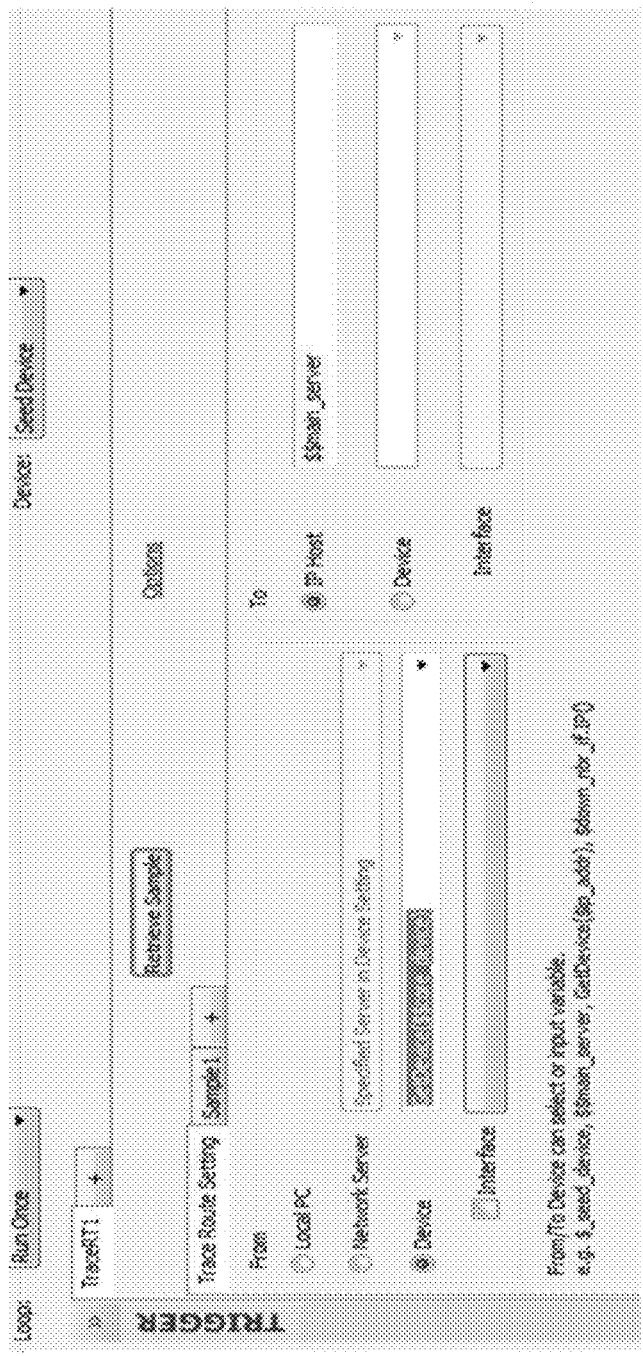
FIG. 16 shows an exemplary GUI for defining a Traceroute Probe, according to some embodiments of the present disclosure.

FIG. 16 shows an exemplary method to define a Traceroute Probe. The process of defining a Traceroute Probe is similar to that of a Ping Probe. Ping and Traceroute Probes can be defined to run from a list of core network devices to a list of main servers after a network change. This automation can be much quicker and more reliable compared to a manual process.

A Configuration Probe is configured to parse and highlight configurations. For example, the Configuration Probes can be used in the following cases: 1) Create a report for devices containing a particular configuration line. For example, find devices with "no service password-encryption" configuration, which violates basic security policies. 2) Highlight or draw a particular configuration in a Q-map. 3) Conduct a preliminary check before applying an additional Procedure. This can improve the performance of the Procedure since the Configuration Probe uses baseline configurations without retrieving data from devices. For example, a user can check whether OSPF is configured to run on a router before applying any Procedure to troubleshoot OSPF routing issues.

Figure 17:
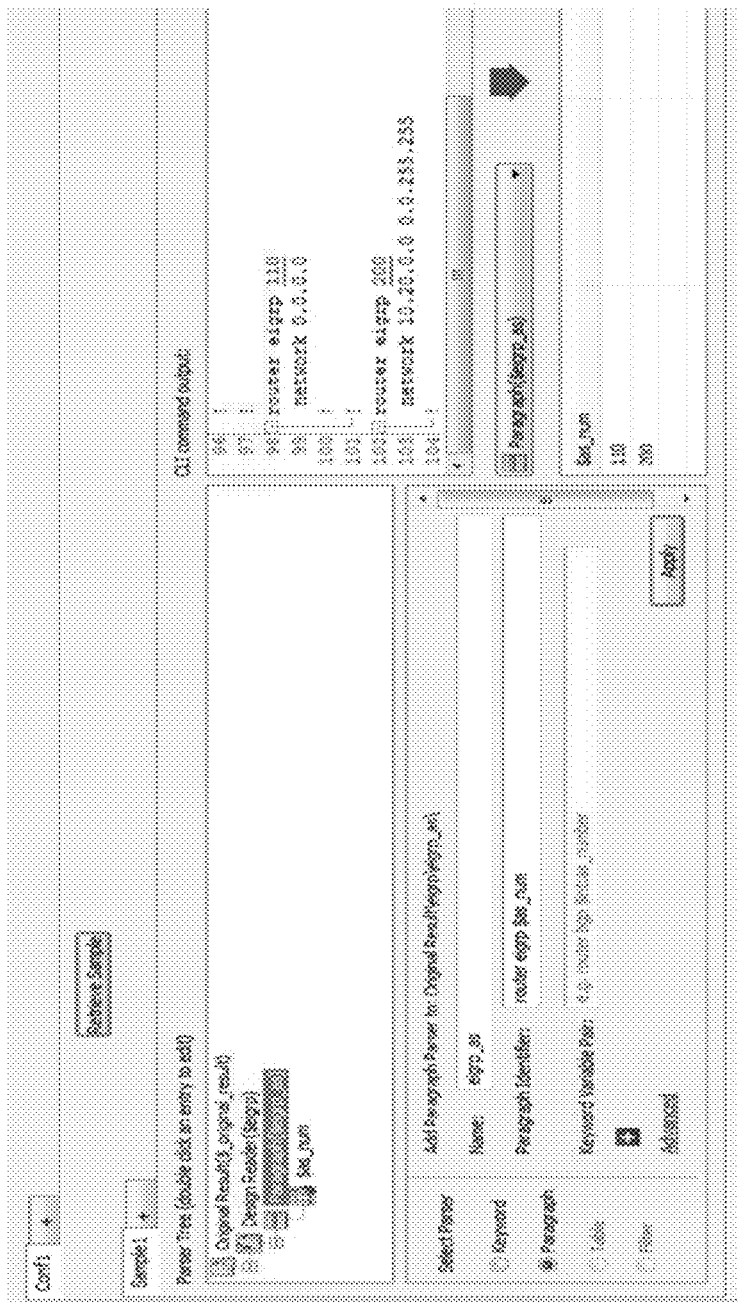
FIG. 17 shows an exemplary GUI for configuring a Probe Parser, according to some embodiments of the present disclosure.

FIG. 17 shows an exemplary method to define a Configuration Probe. In FIG. 17, the Parser and Trigger of a Configuration Probe are the same as those of the CLI command Probe. The differences may be that the Configuration Probe works on configurations and therefore there is no need to define a CLI command to retrieve data.

Figure 18:
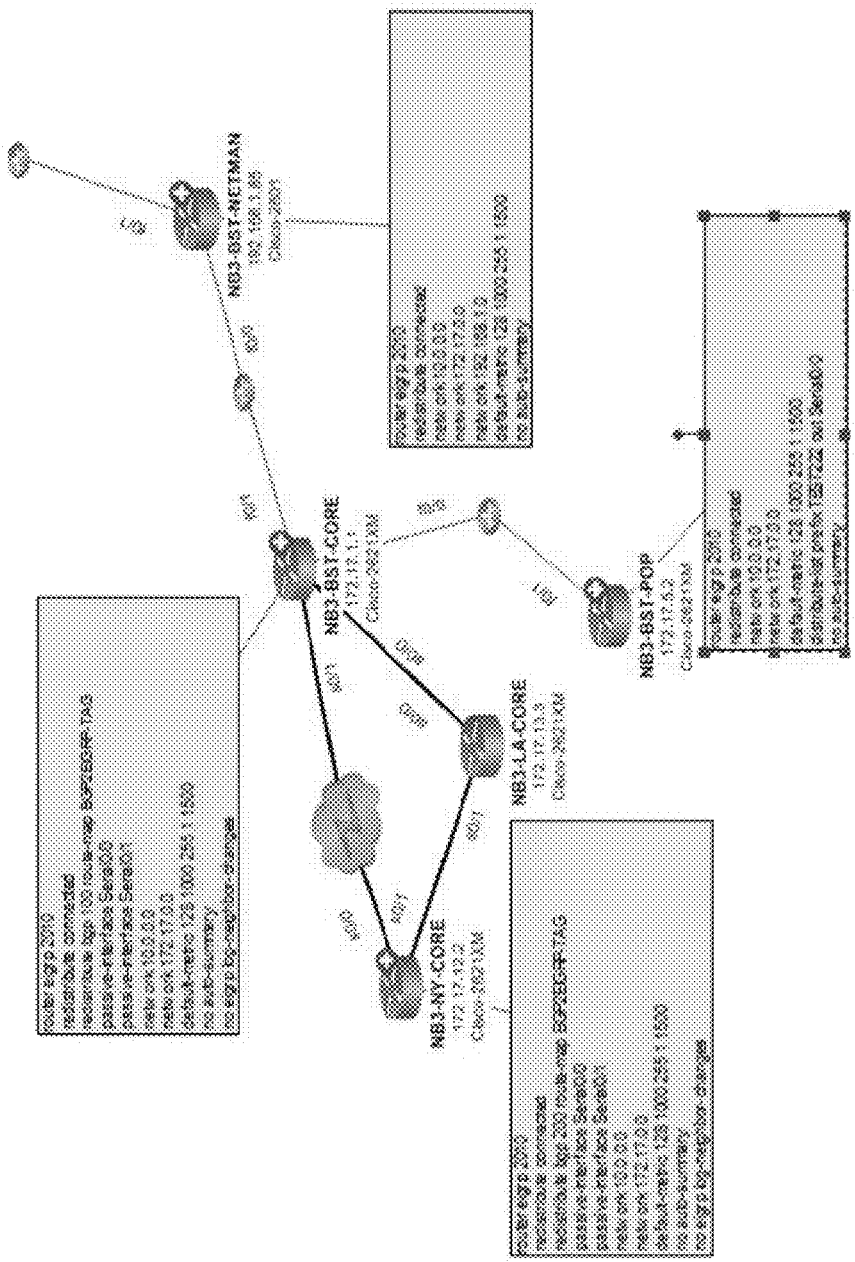
FIG. 18 shows an exemplary network map created using a Procedure, according to some embodiments of the present disclosure.

FIG. 18 shows an exemplary network map created using a Procedure.

Embodiments consistent with the present disclosure involve system and method for automating network management tasks. Network management tasks may include network performance monitoring, network troubleshooting, network architecture mapping, or other tasks. Automating network management tasks may be accomplished using one or more network management applications. For convenience of description, a network management application is also referred to as a Qapp, although such an application can have any name.

In some embodiments, a Qapp may include one or more procedures. The one or more procedures may be used to retrieve information from a network (e.g., a live computer network). The Qapp may also include an analysis routine to define, for example, how to display the information retrieved using the procedures. The analysis routine may also analyze the retrieved information and create one or more alerts based on the analysis. The alerts may include textual alert messages and graphical alerts. The graphical alerts may include visual effects made to a map of the network. For example, one or more portions of the map relevant to the retrieved information may be highlighted and/or displayed in different colors.

In some embodiments, a Qapp may be created using a GUI. Creating a Qapp may include two steps: the first step involves defining one or more procedures to retrieve data from the network; the second step involves defining an analysis routine for analyzing the retrieved data and displaying the data.

A Qapp may be saved and shared among network professionals. Executing a Qapp may automate network management tasks such as troubleshooting and performance monitoring. For example, executing an Qapp can perform the followings tasks automatically:

Describe a network problem or best practice;
Recursively execute one or more network commands, obtain data from a network based on the execution of the network command(s), and display the data on a map of the network;
Analyze the data obtained from the network;
Create an alert (e.g., an alert message and/or a graphical alert) when a certain condition is satisfied, such as when a threshold value is crossed; and
Create and save a historical chart based on the analysis of the data for playback and/or future analysis.

Figure 19:
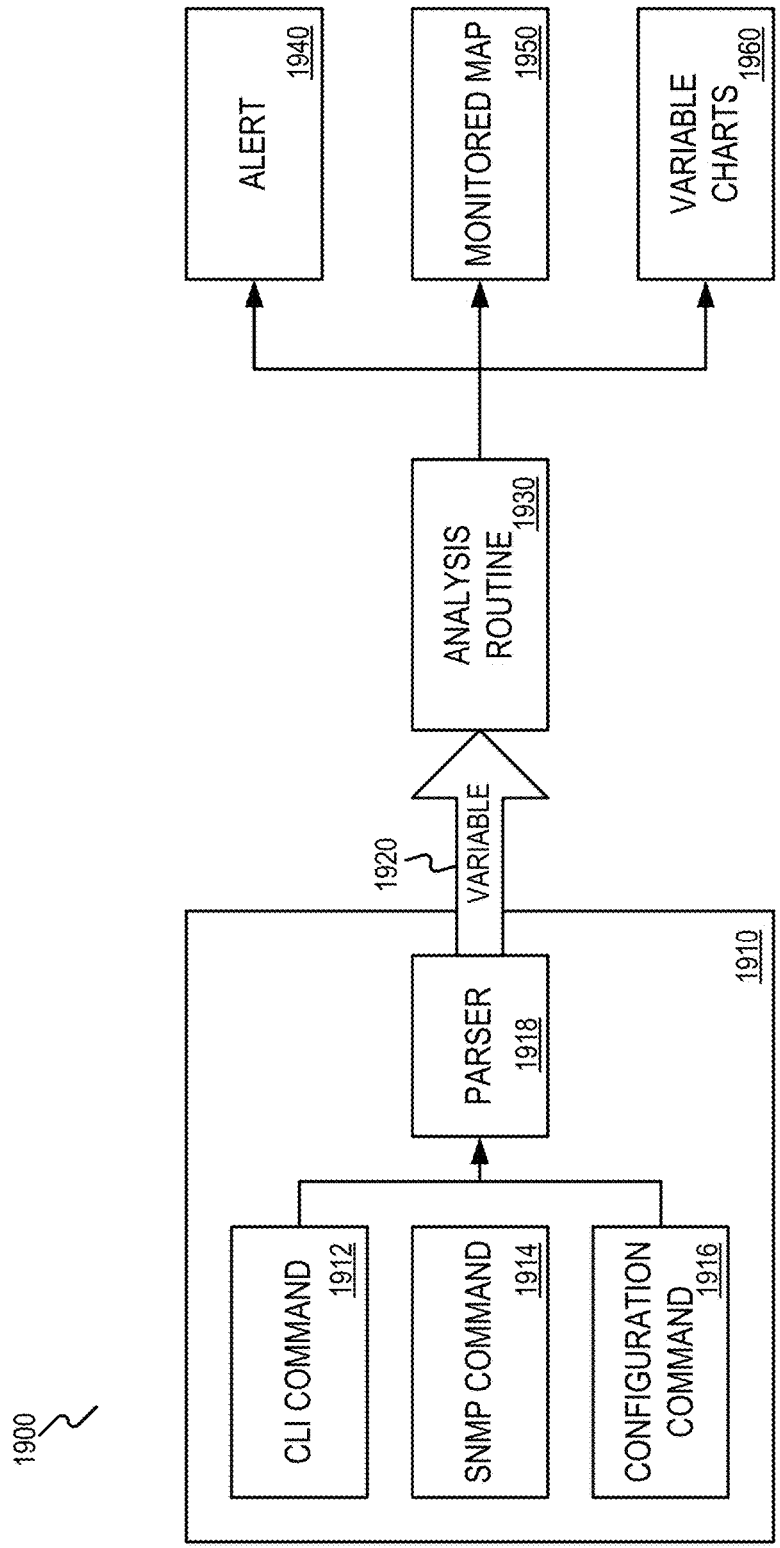
FIG. 19 is a block diagram illustrating exemplary components of a network management application (Qapp), according to some embodiments of the present disclosure.

FIG. 19 is a block diagram illustrating exemplary components of a Qapp 1900. Qapp 1900 may include an executable procedure 1910 and an analysis routine 1930. Procedure 1910 can be created via a GUI, such as GUI 105, to receive from a user a network command to be executed on a computer network. The network command may include one or more CLI commands 1912, one or more simple network management protocol (SNMP) commands 1914, and/or one or more configuration commands 1916. The results of the execution of the network command may be parsed by a parser 1918 to retrieve useful information. For example, when the results include a network parameter indicating network operating status, the network parameter may be identified and stored in a variable 1920. Variable 1920 may be used to transfer information retrieved from the computer network to an analysis routine 1930 for further analysis. Analysis routine 1930 may include analytical logics operating on variable 1920 to generate analysis results, such as an alert 1940, a monitored map 1950, and/or a variable chart 1960.

Figure 20:
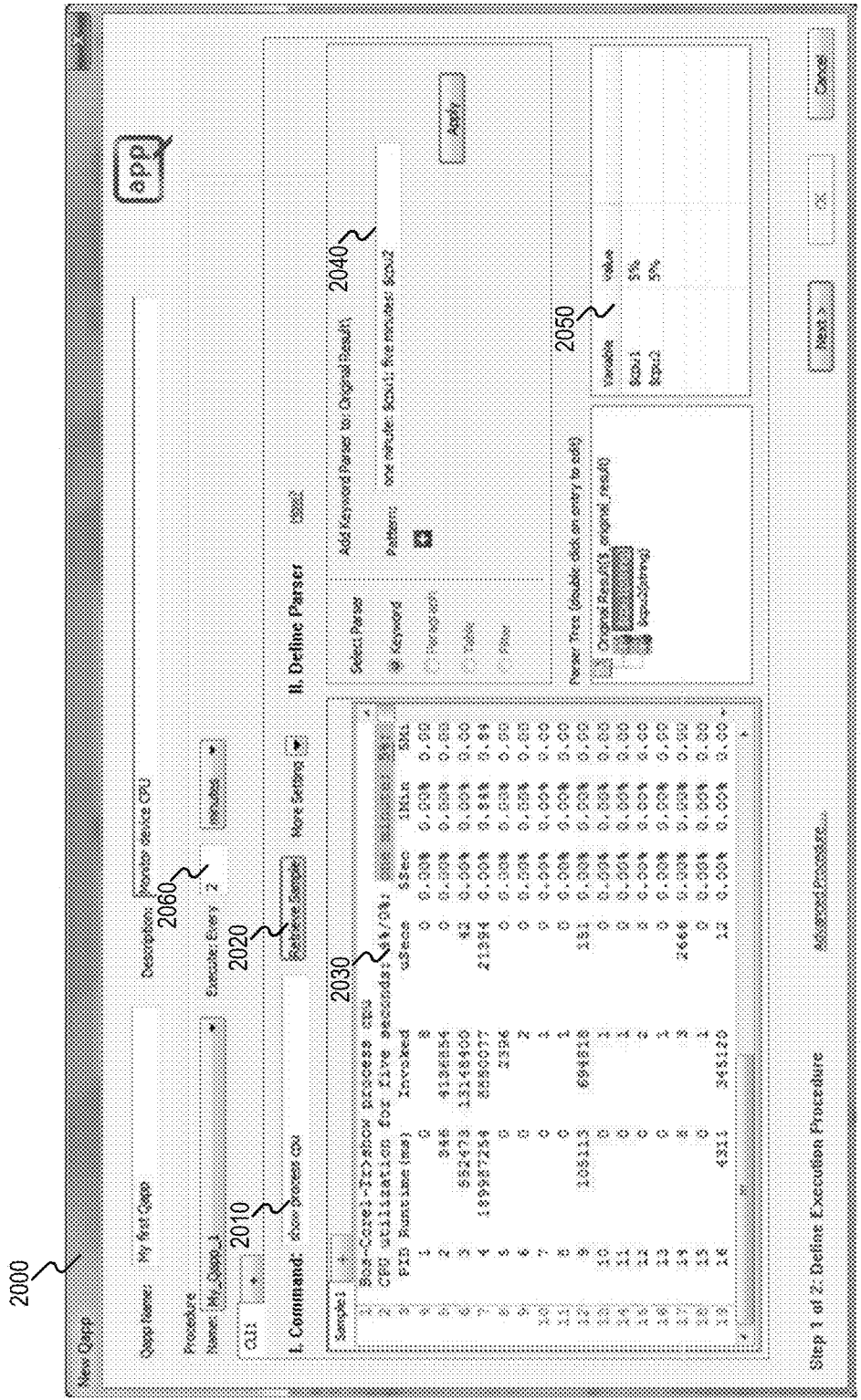
FIG. 20 shows an exemplary GUI to define an exemplary procedure of a Qapp, according to some embodiments of the present disclosure.

FIG. 20 shows an exemplary GUI 2000 for defining an exemplary procedure of a Qapp. GUI 2000 includes an input box 2010 for receiving a network command, such as a CLI command, to be executed on a computer network. A user can input a network command, such as "show process cpu" shown in FIG. 20, to obtain a result from the computer network (e.g., from a network device) by, for example, clicking a button 2020 to execute the network command. Pane 2030 shows the result, which includes information about CPU utilization. Based on the result, a user may define a parser, such as a keyword parser shown in FIG. 20, to retrieve information associated with a network parameter based on the result. For example, in the example shown in FIG. 20, the parser is defined by a pattern in input box 2040, which includes a first variable $cpu1 to store information associated with a first network parameter (e.g., CPU utilization information for one minute) and a second variable $cpu2 to store information associated with a second network parameter (e.g., CPU utilization information for five minutes). Once the parser is defined, the values of these variables can be viewed in pane 2050.

Defining a Qapp parser is similar to defining a procedure parser. However, one difference between these two types of parsers is that the network command used in a Qapp can be executed recursively. Accordingly, the Qapp parser may retrieve information from the recursively obtained result (e.g., obtained in response to the recursive execution of the network command) and recursively update the variable storing the retrieved information. In some embodiments, the frequency for recursively updating the variable (also the frequency to recursively execute the network command) may be defined in an input field 2060 through GUI 2000. For example, FIG. 20 shows an exemplary frequency of 2 minutes.

The value of a network parameter, such as CPU utilization, may be retrieved by the parser (shown in input box 2040) and saved in variable $cpu1 or $cpu2 each time the network command (shown in input box 2010) is executed. The settings and configurations of a Qapp, such as the network command to be executed, the parser used to retrieve information, and an analysis routine (to be described in greater detail later), can be packaged together and saved as an executable network management application (Qapp) for future use or for sharing with others. When the saved Qapp is executed, the network instruction (e.g., the CLI command shown in input box 2010) can be executed recursively (e.g., at a frequency defined in input box 2060). Each time the network instruction is executed, a result can be obtained, similar to the result shown in pane 2030 of FIG. 20, except that the value of the CPU utilization may be changed. The parser defined using the pattern shown in input box 2040 can retrieve the relevant information (e.g., the values of CPU utilization) based on the result and store the retrieved information in variables $cpu1 and $cpu2. In this way, the values of these variables can be updated/stored periodically. A historical chart of the CPU utilization (e.g., CPU utilization as a function of time) can be generated using the data stored in variable $cpu1/$cpu2 and displayed to the user. Because the values of these variables indicate network parameters of the computer network being managed, the historical chart can be of a great help to network performance monitoring or troubleshooting.

Figure 21:
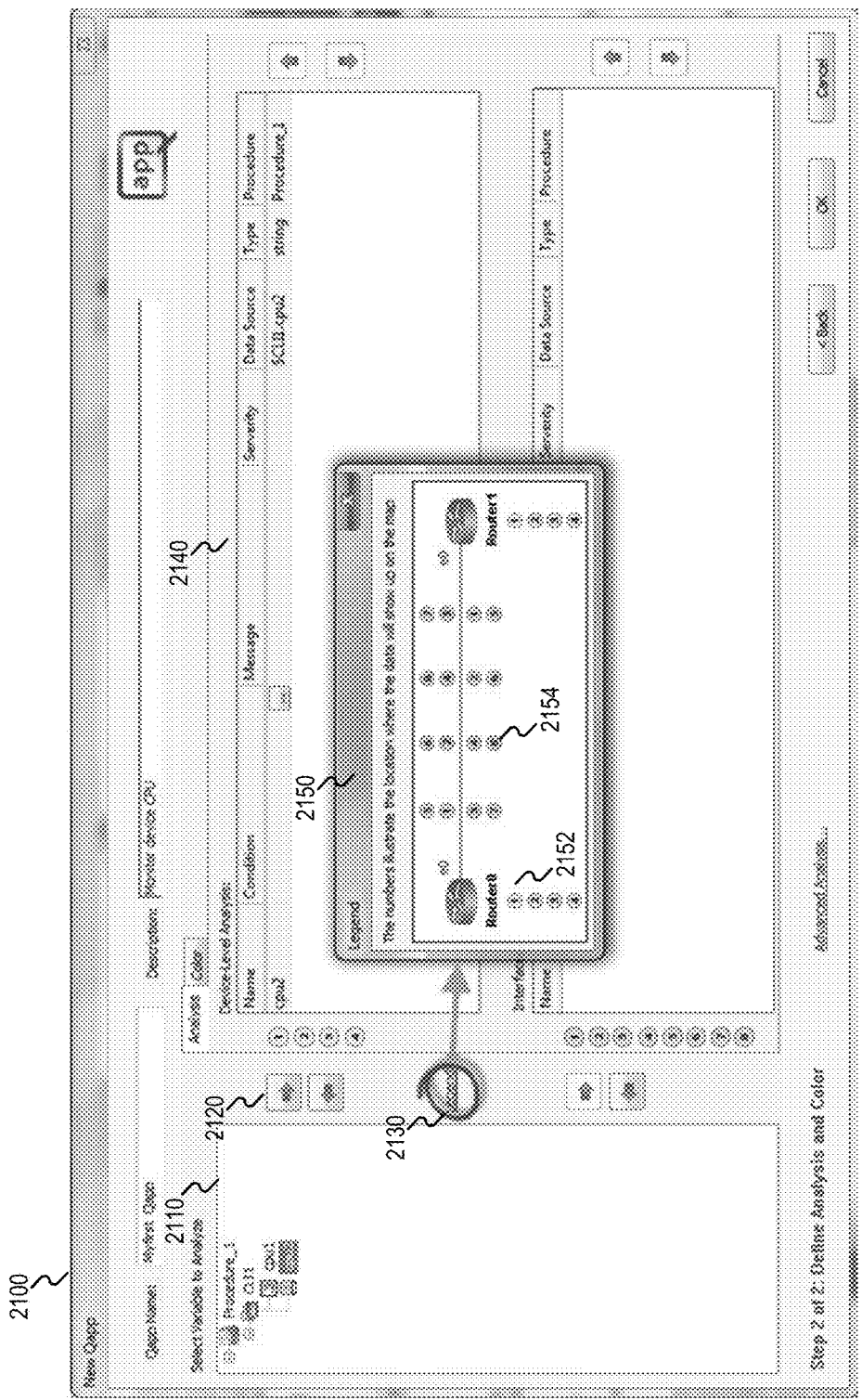
FIG. 21 shows an exemplary GUI to define an exemplary analysis routine of a Qapp, according to some embodiments of the present disclosure.

FIG. 21 shows an exemplary GUI 2100 for defining an exemplary analysis routine of a Qapp. As shown in FIG. 21, variables defined using GUI 2000 (e.g., cpu1 and cpu2) can be displayed in pane 2110 of GUI 2100. The user can select any variable such as cpu1 and click an arrow icon 2120 to add the variable to an analysis tab 2160. Variables added to analysis tab 2160 may be displayed in a network map and/or subject to further analysis. Variables may include device-level variables (or device variables) and interface-level variables (or interface variables). Device variables refer to information relating to network devices, such as CPU utilization shown in FIGS. 20 and 21. Interface variables refer to information relating to network connections, such as cable interfaces, wireless interfaces, etc. As shown in FIG. 21, analysis tab 2140 includes separate areas for device variables and interface variables. A Legend link 2130 can show location information for displaying one or more variables and/or alerts on a network map. For example, in a pop-up window 2150, device variables 2152 are to be displayed under their corresponding devices (e.g., Router0 or Router1), while interface variables are to be displayed along the connection path between the devices.

Figure 22:
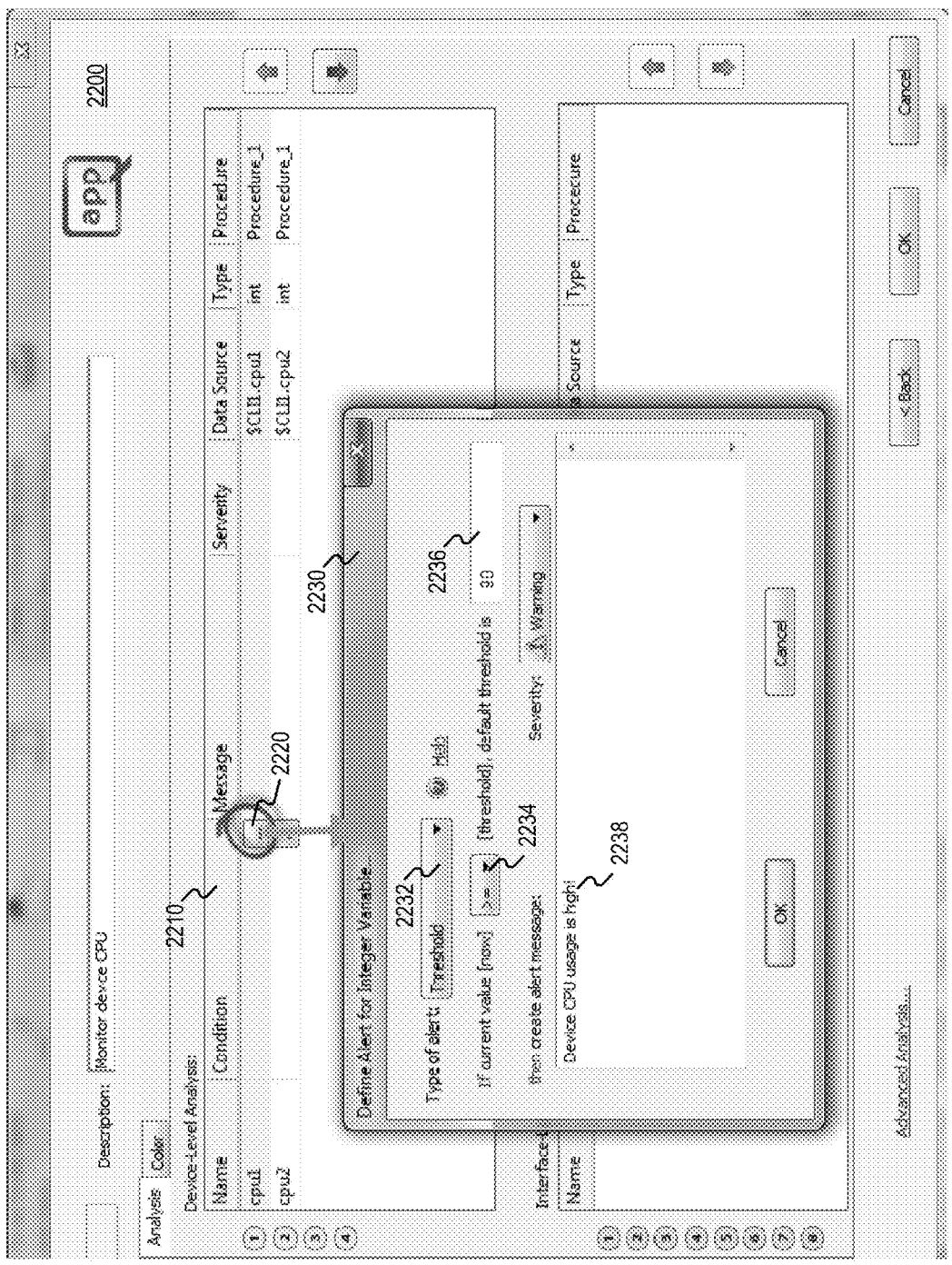
FIG. 22 shows an exemplary GUI to define a textual alert, according to some embodiments of the present disclosure.

In addition to displaying a variable value on a network map, the analysis routine also allows a user to define one or more alerts based on the variable. FIG. 22 shows an exemplary GUI 2200 to define an alert. As shown in FIG. 22, the analysis routine includes a condition 2210, which can be defined in a pop-up window 2230 by clicking a button 2220. In the example of FIG. 22, the alert is a threshold type alert, as shown in selection list 2232. The condition to be evaluated is defined by a logic sign 2234 and a threshold value shown in input box 2236. Here, the current CPU utilization value (variable cpu1) is compared against a threshold value such as 90%. If the value is equal to or larger than the threshold, a textual alert, such as alert message 2238 ("Device CPU usage is high!") is generated and displayed to the user. In some embodiments, the condition may include whether a variable (e.g., variable cpu1) increases, decreases, or flaps with time. For example, the condition may be satisfied when cpu1 increases. In another example, the condition may be stratified when cpu1 fluctuates with time.

Figure 23:
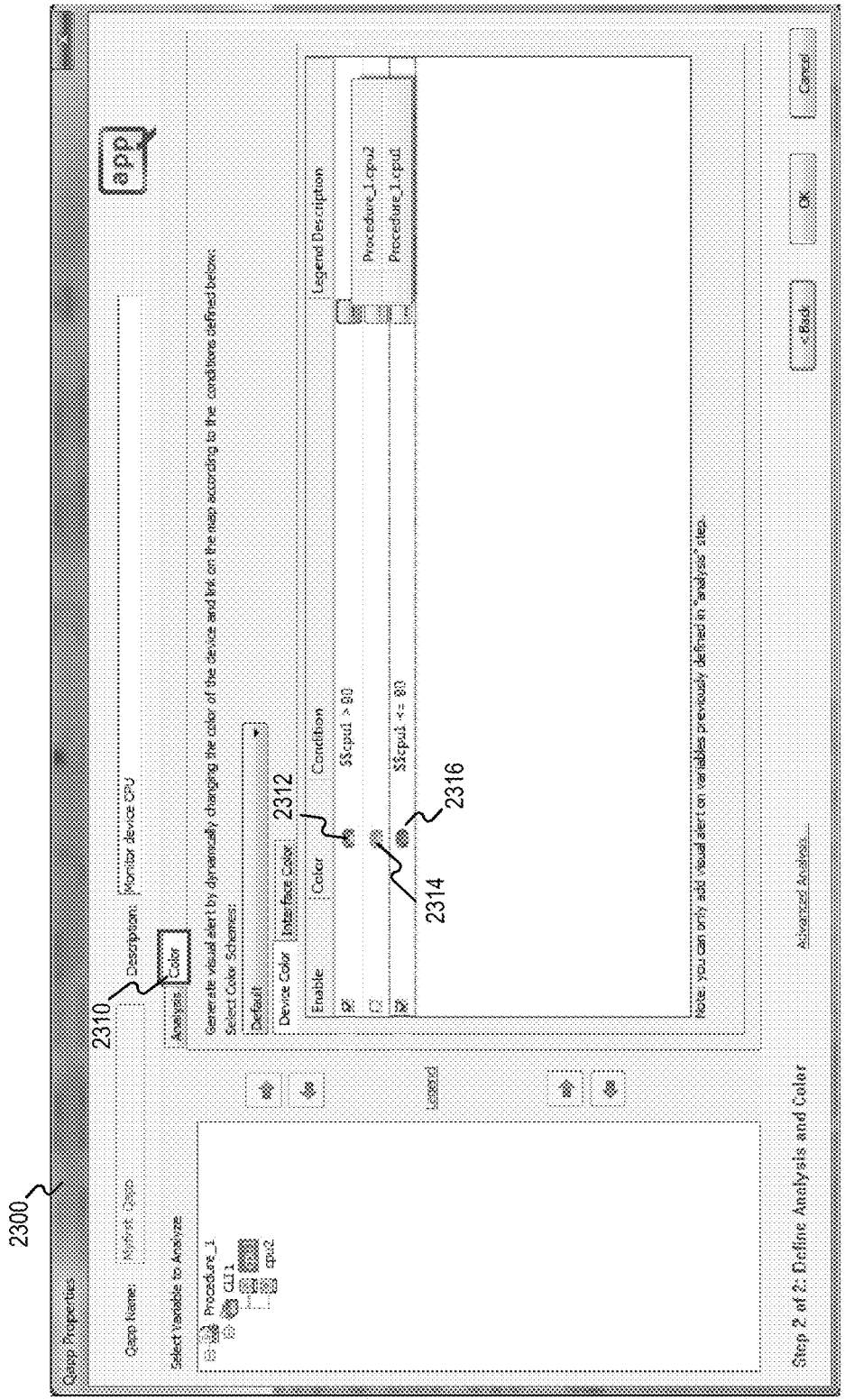
FIG. 23 shows an exemplary GUI to define a graphical alert, according to some embodiments of the present disclosure.

An analysis routine may also include graphical alerts (also referred to as visual alerts). FIG. 23 shows an exemplary GUI 2300 to define a graphical alert. In this example, a device can be represented on a network map as a graphical indicator and the graphical indicator may be displayed in three possible colors: red (2312), yellow (2314), and green (2316). The colors and/or conditions associated with each color can be defined using tab 2310. In this example, the device is displayed in red color if cpu1 utilization is higher than 90% and in green color otherwise (note that yellow color is not enabled in this example).

Figure 24:
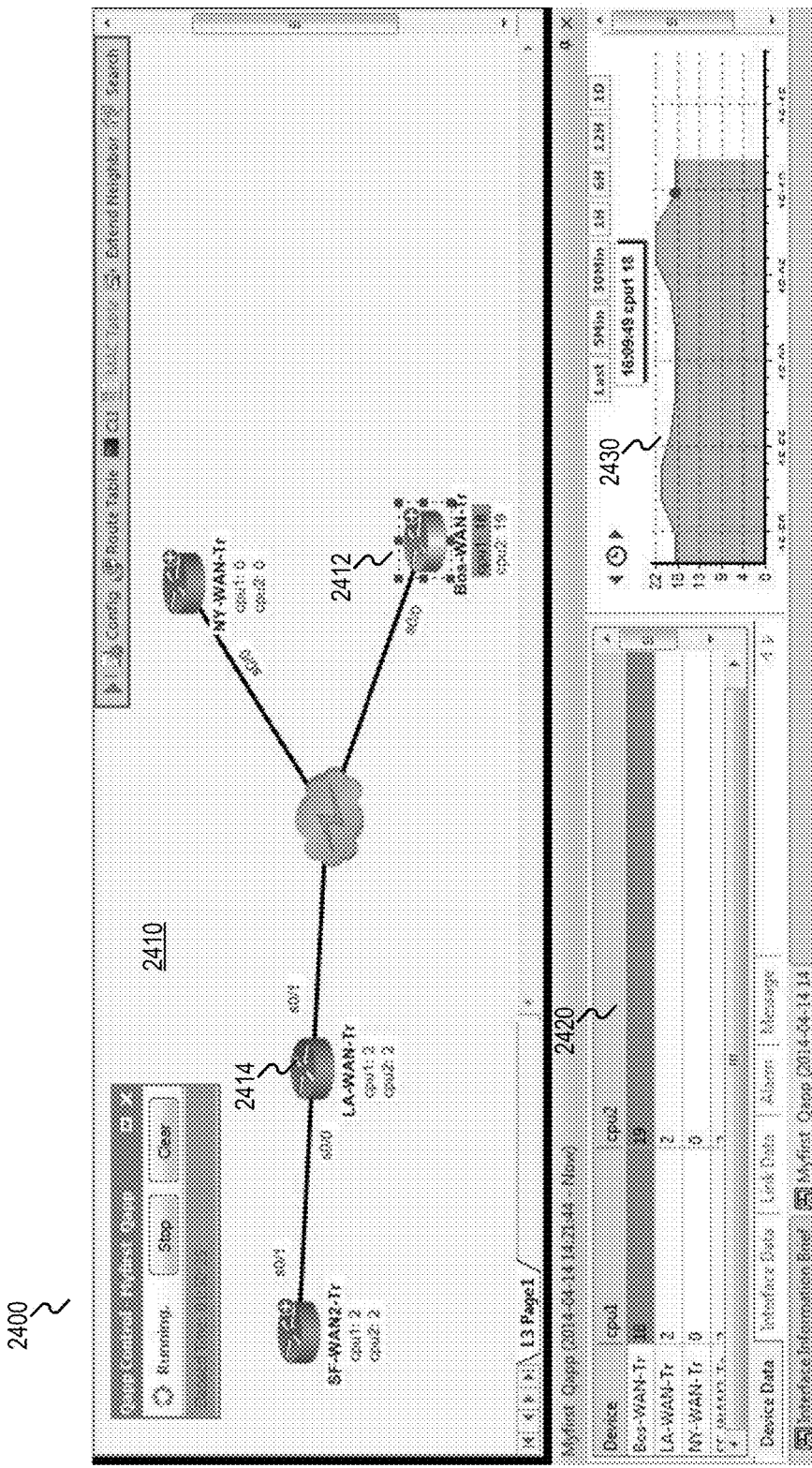
FIG. 24 shows an exemplary GUI to display a Qapp execution result for device level data, according to some embodiments of the present disclosure.

A Qapp may be executed within a map of the network. The data retrieved from the live network and parsed in the Qapp recursively according to the configured frequency may be displayed and updated in the map. FIG. 24 shows an exemplary GUI 2400 to display a Qapp execution result for device level data. GUI 2400 may be displayed when the Qapp defined in FIGS. 20-23 is running to recursively retrieve information from the computer network and update variables $cpu1 and $cpu2. GUI 2400 may include a pane 2410 displaying a network map (e.g., a topology network map) including a plurality of graphical indicators depicting network components of the computer network being managed. For example, the network map may include a graphical indicator 2412 indicating a WAN in Boston and a graphical indicator 2414 indicating a WAN in Los Angeles.

The current values of CPU utilization of a network component are displayed under the graphical indicator of that network component, as defined in window 2150 of FIG. 21. The Qapp may compare the current value of a variable with a threshold according to the analysis routine defined in GUI 2200 of FIG. 22. For example, the threshold for cpu1 of the Boston WAN 2412 may be set to 15. When the value of cpu1 is above 15, an alert may be generated. In FIG. 24, the alert is displayed as a change of color (e.g., from green to red) of the graphical indicator and a highlighting of the CPU utilization value. In some embodiments, the alert may be generated when the value of a network parameter is beyond or out of a threshold (for example, above or below the threshold depending on configurations).

In one embodiment, the alert may be removed once the value of a variable is no longer beyond the threshold. For example, in FIG. 24, when the value of cpu1 of Boston WAN 2412 falls back to 10, which is below the threshold of 15, the color of Boston WAN 2412 may be changed back to green and the highlighting of cpu1 may be removed. In another embodiment, the alert may be removed after a predetermined time period has past following the event that the value of a variable is no longer above/below the threshold. For example, in FIG. 24, when the value of cpu1 of Boston WAN 2412 falls back to 10, which is below the threshold of 15, the color of Boston WAN 2412 or the highlighting of cpu1 may not be changed immediately, but may stay for a predetermined time period. If after the predetermined time period, the value of cpu1 is still below the threshold, the color of Boston WAN 2412 may be changed to green and the highlighting of cpu1 may be removed. In yet another embodiment, the alert may not be removed automatically, but may stay until further actions.

In some embodiments, the alert may include a change of display of at least one of the plurality of graphical indicators on the network map. The change of display may include a change of color, a change of size, a change of shape, a change of highlighting, a change of description, or a combination thereof.

In addition to the network map, GUI 2400 may include a pane 2420 that displays the variables in a table format. GUI 2400 may also include a pane 2430 to display a historical chart of a variable in addition to its current value. For example, pane 2430 displays the values of cpu1 as a function of time. Displaying the historical chart may provide valuable information of the network operation status because certain network activities may occur in a relatively short time window and therefore difficult to capture without historical data. In the example shown in FIG. 24, the peak CPU utilization of cpu1 is about 22 and occurs briefly prior to the current time point. With historical data such as the chart shown in pane 2430, a user may obtain valuable information about the network operating status.

Figure 25:
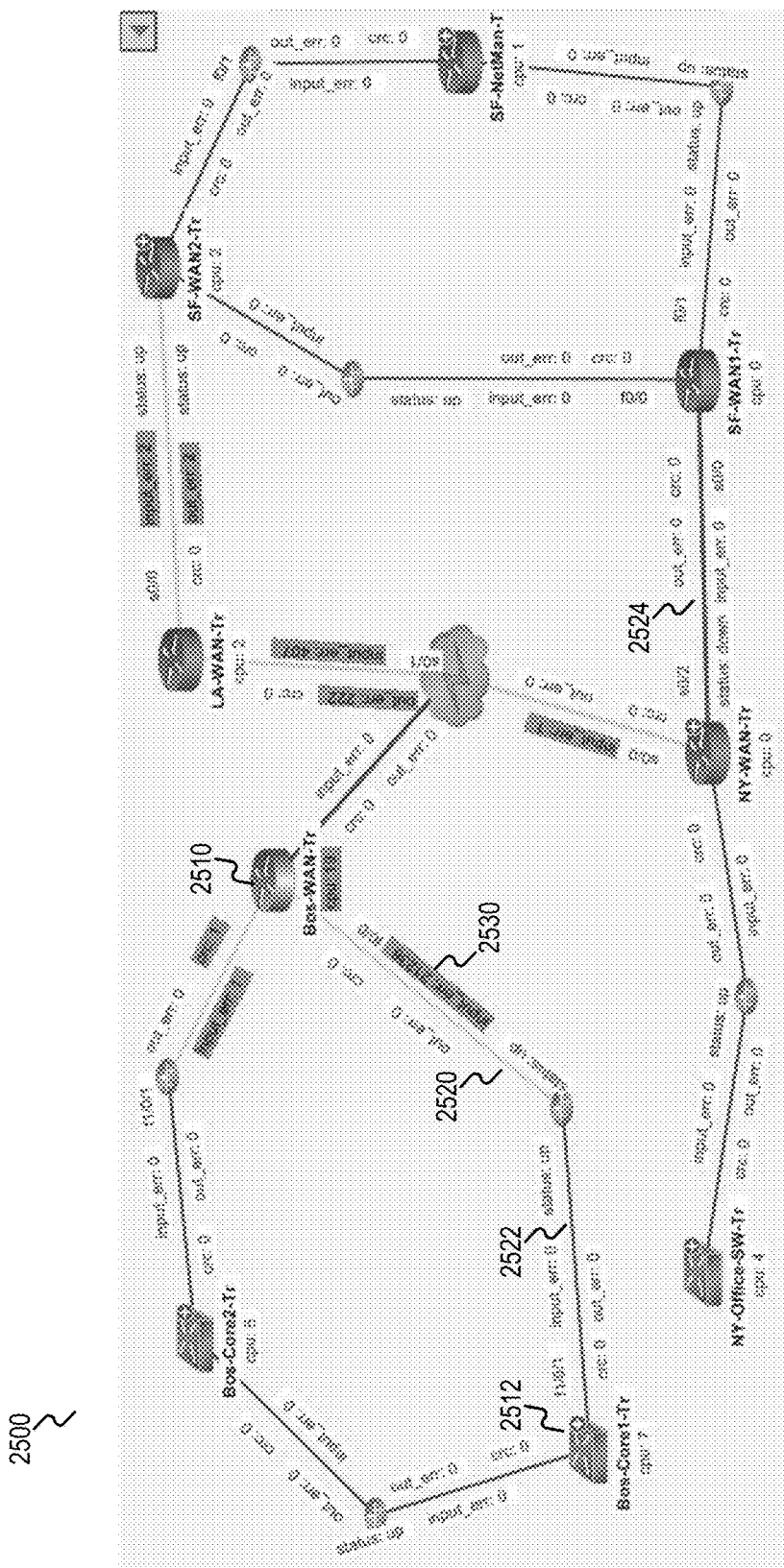
FIG. 25 shows an exemplary network map to display a Qapp execution result for interface level data, according to some embodiments of the present disclosure.

FIG. 25 shows an exemplary network map 2500 having multiple types of alerts. Network map 2500 includes graphical indicators of network components such as core network 2512, WAN 2510, and connections 2522, 2520, and 2524. Using a Qapp such as that shown in FIG. 19, a plurality of network parameters may be monitored by recursively executing network command(s), parsing result(s), and analyzing the parsed information. The monitored network parameters (e.g., through their corresponding variables) may be displayed on network map 2500 in various forms. For example, CPU utilization values of a network device may be displayed near the corresponding device. Input/output errors and status of network interfaces corresponding to a connection may be displayed near the corresponding connection, such as connection 2522. When there is no error, the connection may be displayed in green color (e.g., connection 2522). When one or more errors occur, the error message may be highlighted (e.g., error message 2530) and the connection may be displayed in yellow color (e.g., connection 2520). When the status of a connection is down, the connection may be displayed in red color (e.g., connection 2524). As described above, the types of information and alerts that can be displayed on network map 2500 are not limited to the color, highlighting, and text, other forms of display, such as size, shape, font, description, etc., may also be used to display dynamic network information.

Figure 26:
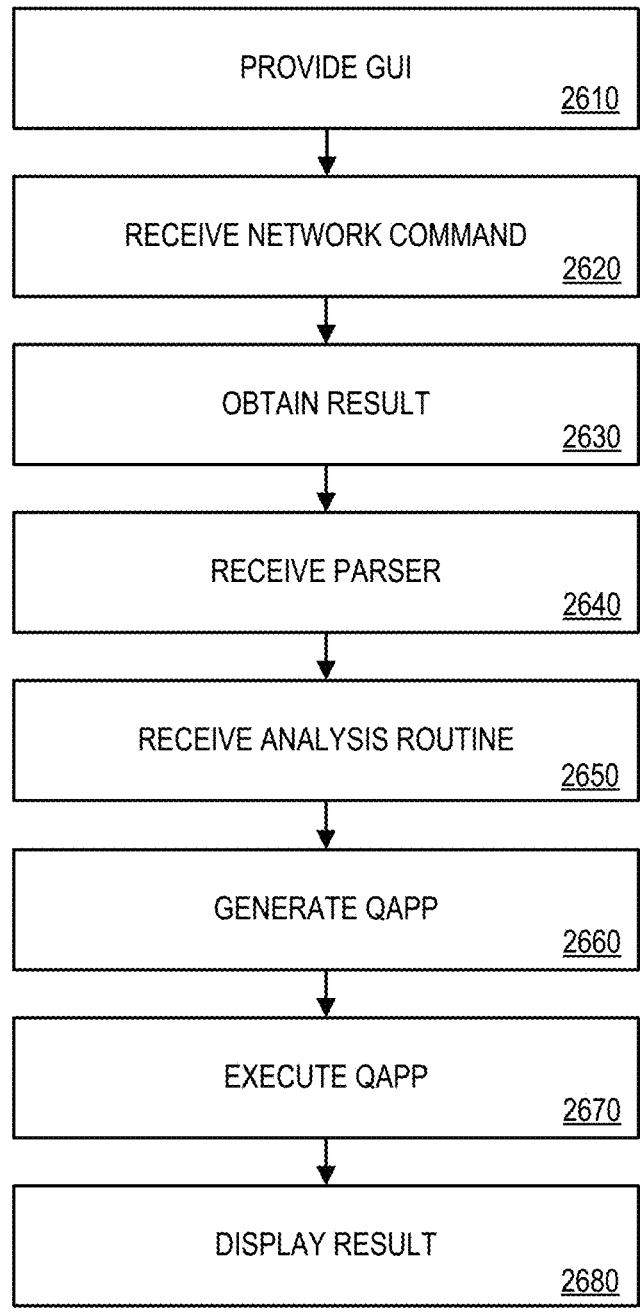
FIG. 26 is a flow chart of an exemplary method for creating and executing a Qapp, according to some embodiments of the present disclosure.

FIG. 26 is a flow chart of an exemplary method 2600 for creating and executing a Qapp. Method 2600 may be implemented by system 100. System 100 may include a processor device and a memory device. The memory device may store computer codes for automating network management tasks associated with a computer network. The processor device may be operatively coupled to the memory device. When the computer codes stored on the memory device are executed by the processor device, the computer codes may cause the processor device to perform operations to implement method 2600.

At step 2610, a GUI (e.g., GUI 2000, 2100, 2200, or 2300) may be provided. At step 2620, a network command (e.g., a CLI command, a SNMP command, a Configuration command, or other command) to be executed on the computer network may be received through the GUI (e.g., through input box 2010). At step 2630, system 100 may obtain a result (e.g., result shown in pane 2030) from the computer network based on an execution of the network command on the computer network (e.g., upon a click of button 2020). At step 2640, system 100 may receive a parser (e.g., parser 2040) for retrieving information associated with a network parameter (e.g., CPU utilization) based on the result. The parser may include a variable (e.g., cpu1 or cpu2 shown in parser 2040) for storing the retrieved information. At step 2650, system 100 may receive an analysis routine (e.g., analysis routine defined in tab 2140) for analyzing the computer network based on variables cpu1 and cpu2. At step 2660, system 100 may generate a network management application (a Qapp) based on the parser and the analysis routine. At step 2670, system 100 may execute the Qapp to retrieve and parser information from the computer network recursively and to analyze the information. At step 2380, system 100 may display analysis result in a GUI (e.g., on network map 2400 or 2500).

Figure 27:
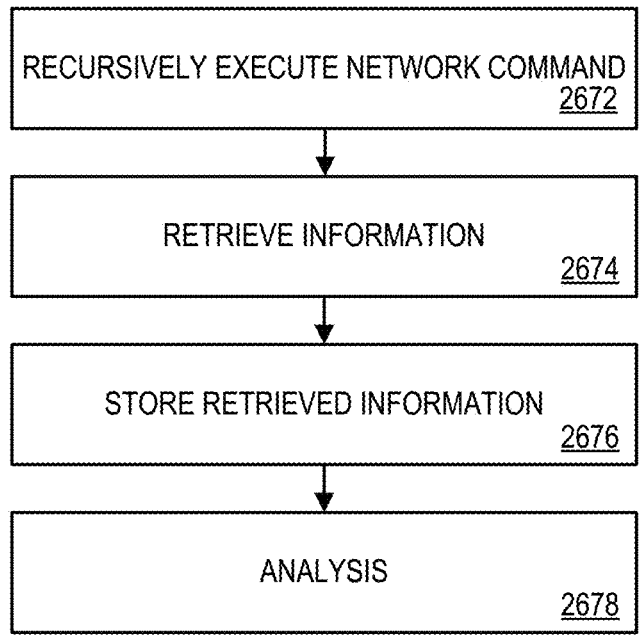
FIG. 27 is a flow chart of an exemplary implementation of executing a Qapp.

FIG. 27 is a flow chart of an exemplary implementation of step 2670 for executing the Qapp. As shown in FIG. 27, at step 2672, the Qapp may recursively execute a network command (e.g., the network command as defined in input box 2010) to obtain result information (e.g., result information similar to those shown in pane 2030) from the computer network. At step 2674, the Qapp may use a parser (e.g., parser as defined in input box 2040) to retrieve information associated with a network parameter (e.g., CPU utilization) based on the result information. At step 2676, the Qapp may store the retrieved information in a variable (e.g., cpu1 or cpu2 as defined in parser 2040). At step 2678, the Qapp may analyze the computer network based on the variable using an analysis routine (e.g., the analysis routine defined in FIGS. 21-23).

The specification has described network management systems and methods. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store computer code instructions for execution by one or more processors, including computer code instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a processor device, for providing network management automation, the method comprising:

providing a graphical user interface (GUI) for automating network management tasks associated with a computer network;

receiving, through the GUI, a network command to be executed on the computer network;

executing the received network command on the computer network;

obtaining, by the processor device, a result from the computer network based on the execution of the received network command, wherein the obtained result comprises information associated with one or more network parameters;

defining, through the GUI, a parser for retrieving the information associated with the one or more network parameters in the obtained result, the parser comprising a defined pattern including a variable for storing the information associated with the one or more network parameters in the obtained result;

defining, through the GUI, an analysis routine for analyzing the computer network based on the variable;

generating, by the processor device, an executable network management application comprising the received network command, the defined parser and the defined analysis routine, the executable network management application including instructions for updating the variable recursively; and saving the generated executable network management application so as to be executed at some point in the future or shared, wherein the analysis routine further includes location information indicating where to display the variable with respect to a graphical indicator representing a corresponding network component in a topology network map of the computer network.

2. The method of claim 1, wherein the network command includes at least one of a command-line interface (CLI) command, a configuration command, or a simple network management protocol (SNMP) command.

3. The method of claim 1, further comprising:
defining, through the GUI, a frequency value for updating the variable recursively; and
generating, by the processor device, the executable network management application to include the defined frequency value for updating the variable recursively.

4. The method of claim 1, wherein the parser includes at least one of:
a keyword parser;
a paragraph parser;
a table parser; or
a filter parser.

5. The method of claim 1, wherein the analysis routine includes a condition to be evaluated based on the variable and an alert to be displayed when the condition is satisfied.

6. The method of claim 5, wherein the condition includes a threshold to be compared with the variable.

7. The method of claim 5, wherein the condition includes whether the variable increases, decreases, or flaps with time.

8. The method of claim 5, wherein the alert includes at least one of a textual alert or a change of display of one or more graphical indicators.

9. The method of claim 5, wherein the analysis routine further includes location information indicating where to display the alert with respect to the graphical indicator in the topology map of the computer network.

10. A system for providing network management automation, the system comprising:
a memory device storing computer codes for automating network management tasks associated with a computer network; and
a processor device operatively coupled to the memory device, wherein the computer codes stored on the memory device, when executed by the processor device, cause the processor device to perform operations comprising:
providing a graphical user interface (GUI);
receiving, through the GUI, a network command to be executed on the computer network;
executing the received network command on the computer network;
obtaining a result from the computer network based on the execution of the received network command, wherein the obtained result comprises information associated with one or more network parameters;
defining, through the GUI, a parser for retrieving the information associated with the one or more network parameters in the obtained result, the parser comprising a defined pattern including a variable for storing the information associated with the one or more network parameters in the obtained result;
defining, through the GUI, an analysis routine for analyzing the computer network based on the variable;
generating an executable network management application comprising the received network command, the defined parser and the defined analysis routine, the executable network management application including instructions for updating the variable recursively; and
saving the generated executable network management application so as to be executed at some point in the future or shared,
wherein the analysis routine further includes location information indicating where to display the variable with respect to a graphical indicator representing a corresponding network component in a topology network map of the computer network.

11. The system of claim 10, wherein the network command includes at least one of a command-line interface (CLI) command, a configuration command, or a simple network management protocol (SNMP) command.

12. The system of claim 10, wherein the operations further comprise: defining, through the GUI, a frequency value for updating the variable recursively; and
generating the executable network management application to include the defined frequency value for updating the variable recursively.

13. The system of claim 10, wherein the analysis routine includes a condition to be evaluated based on the variable and an alert to be displayed when the condition is satisfied.

14. The system of claim 13, wherein the condition includes a threshold to be compared with the variable.

15. The system of claim 13, wherein the alert includes at least one of a textual alert or a change of display of one or more graphical indicators.

16. The system of claim 13, wherein the analysis routine further includes location information indicating where to display the alert with respect to the graphical indicator in the topology map of the computer network.

17. The method of claim 1, wherein the network command comprises "show process CPU".

18. The method of claim 1, wherein the one or more network parameters comprise CPU utilization for a certain period.

19. The system of claim 10, wherein the network command comprises "show process CPU".

20. The system of claim 10, wherein the one or more network parameters comprise CPU utilization for a certain period.

* * * * *